United States Patent
Helmke et al.

(10) Patent No.: US 9,693,577 B2
(45) Date of Patent: *Jul. 4, 2017

(54) METHOD OF PREPARING A NUTRITIONAL POWDER COMPRISING SPRAY DRIED HMB

(71) Applicant: Abbott Laboratories, Abbott Park, IL (US)

(72) Inventors: Charles Helmke, Gahanna, OH (US); Paul Johns, Columbus, OH (US); Ann Kensler, Sugar Grove, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 712 days.

This patent is subject to a terminal disclaimer.

(21) Appl. No.: 14/043,470

(22) Filed: Oct. 1, 2013

(65) Prior Publication Data

US 2014/0030420 A1 Jan. 30, 2014

Related U.S. Application Data

(63) Continuation-in-part of application No. 13/016,041, filed on Jan. 28, 2011, now abandoned.

(60) Provisional application No. 61/299,632, filed on Jan. 29, 2010.

(51) Int. Cl.
| | |
|---|---|
| A23J 1/00 | (2006.01) |
| A23L 1/30 | (2006.01) |
| A23L 3/46 | (2006.01) |
| A23L 33/00 | (2016.01) |
| A23L 33/10 | (2016.01) |
| A23L 33/165 | (2016.01) |

(52) U.S. Cl.
CPC ...... *A23L 1/30* (2013.01); *A23L 3/46* (2013.01); *A23L 33/10* (2016.08); *A23L 33/165* (2016.08); *A23L 33/40* (2016.08); *A23V 2002/00* (2013.01)

(58) Field of Classification Search
CPC ... A23L 1/30; A23L 3/46; A23L 33/40; A23L 33/10; A23L 33/165; A23V 2002/00
USPC ..... 426/72, 73, 74, 471, 580, 601, 602, 613, 426/656, 657, 800, 801
See application file for complete search history.

(56) References Cited

U.S. PATENT DOCUMENTS

| | | |
|---|---|---|
| 3,105,763 A | 10/1963 | North et al. |
| 3,408,210 A | 10/1968 | Heyman |
| 3,542,560 A | 11/1970 | Tomarelli et al. |
| 4,104,290 A | 8/1978 | Koslowsky |
| 4,259,358 A | 3/1981 | Duthie |
| 4,742,081 A | 5/1988 | Stracher et al. |
| 4,992,470 A | 2/1991 | Nissen |
| 5,000,975 A | 3/1991 | Tomarelli |
| 5,028,440 A | 7/1991 | Nissen |
| 5,087,472 A | 2/1992 | Nissen |
| 5,167,957 A | 12/1992 | Webb, Jr. et al. |
| 5,171,442 A | 12/1992 | Nakshbendi |
| 5,219,735 A | 6/1993 | Brule et al. |
| 5,223,285 A | 6/1993 | DeMichele et al. |
| 5,348,979 A | 9/1994 | Nissen et al. |
| 5,360,613 A | 11/1994 | Nissen |
| 5,374,657 A | 12/1994 | Kyle |
| 5,431,928 A | 7/1995 | Saito et al. |
| 5,444,054 A | 8/1995 | Garleb et al. |
| 5,447,732 A | 9/1995 | Tanimoto et al. |
| 5,457,130 A | 10/1995 | Tisdale et al. |
| 5,492,938 A | 2/1996 | Kyle et al. |
| 5,550,156 A | 8/1996 | Kyle |
| 5,601,860 A | 2/1997 | Lien et al. |
| 5,641,531 A | 6/1997 | Liebrecht et al. |
| 5,726,146 A | 3/1998 | Almada et al. |
| 5,780,451 A | 7/1998 | DeMichele et al. |
| 5,834,427 A | 11/1998 | Han et al. |
| 5,976,550 A | 11/1999 | Engel et al. |
| 6,031,000 A | 2/2000 | Nissen et al. |
| 6,060,446 A | 5/2000 | Zaloga et al. |
| 6,080,788 A | 6/2000 | Sole et al. |
| 6,096,358 A | 8/2000 | Murdick |
| 6,099,871 A | 8/2000 | Martinez |
| 6,103,764 A | 8/2000 | Nissen |
| 6,227,261 B1 | 5/2001 | Das et al. |
| 6,248,909 B1 | 6/2001 | Akimoto et al. |
| 6,291,525 B1 | 9/2001 | Nissen |
| 6,294,206 B1 | 9/2001 | Barrett-Reis et al. |
| 6,306,908 B1 | 10/2001 | Carlson et al. |

(Continued)

FOREIGN PATENT DOCUMENTS

| | | |
|---|---|---|
| AU | 2006331950 | 7/2007 |
| CA | 2632262 | 7/2007 |

(Continued)

OTHER PUBLICATIONS

Amendment with RCE for U.S. Appl. No. 13/016,041 dated Sep. 4, 2012.
Applicant-Initiated Interview Summary for U.S. Appl. No. 13/016,041 dated Sep. 5, 2012.
Office Action from U.S. Appl. No. 13/016,041 dated Apr. 1, 2013.
Non-final office action for U.S. Appl. No. 13/016,059 dated Mar. 23, 2012.
Amendment A for U.S. Appl. No. 13/016,059 dated Jun. 25, 2012.
Office action for U.S. Appl. No. 13/016,070 dated Dec. 18, 2012.
Amendment for U.S. Appl. No. 13/016,070 dated Mar. 7, 2013.

(Continued)

*Primary Examiner* — Leslie Wong
(74) *Attorney, Agent, or Firm* — Porter Wright Morris & Arthur LLP

(57) ABSTRACT

Spray dried nutritional powders include soluble calcium, protein, and at least one of a soluble citrate, a soluble phosphate, and combinations thereof as at least one chelating agent. At least a portion of the soluble calcium is calcium HMB. At least a portion of the protein is soluble protein. The spray dried nutritional powders have a weight ratio of soluble calcium binding capacity to total soluble calcium of from about 2.3:1 to about 12:1. The calcium HMB, the at least one chelating agent, and the protein are spray dried together.

7 Claims, No Drawings

(56) References Cited

U.S. PATENT DOCUMENTS

| | | |
|---|---|---|
| 6,340,491 B1 | 1/2002 | Cain et al. |
| 6,365,218 B1 | 4/2002 | Borschel et al. |
| 6,371,319 B2 | 4/2002 | Yeaton et al. |
| 6,420,342 B1 | 7/2002 | Hageman et al. |
| 6,468,987 B1 | 10/2002 | Demichele et al. |
| 6,475,539 B1 | 11/2002 | DeWille et al. |
| 6,521,591 B1 | 2/2003 | Smeets et al. |
| 6,589,576 B2 | 7/2003 | Borschel et al. |
| 6,596,767 B2 | 7/2003 | Masor et al. |
| 6,620,427 B2 | 9/2003 | Lasekan et al. |
| 6,660,258 B1 | 12/2003 | Tovey |
| 6,749,881 B2 | 6/2004 | Kataoka et al. |
| 7,247,320 B2 | 7/2007 | Jost |
| 7,332,178 B2 | 2/2008 | Byard et al. |
| 7,419,596 B2 | 9/2008 | Dueppen et al. |
| 7,435,442 B2 | 10/2008 | Servotte |
| 7,445,807 B2 | 11/2008 | Lockwood |
| 7,498,026 B2 | 3/2009 | Dahlqvist et al. |
| 7,517,850 B2 | 4/2009 | Holt |
| 7,648,721 B2 | 1/2010 | Edens et al. |
| 7,795,204 B2 | 9/2010 | Gardiner et al. |
| 7,825,084 B2 | 11/2010 | Harris et al. |
| 8,217,077 B2 | 7/2012 | Baxter et al. |
| 8,916,217 B2 | 12/2014 | Johns et al. |
| 2001/0008641 A1 | 7/2001 | Krotzer |
| 2002/0035965 A1 | 3/2002 | Uni et al. |
| 2003/0092609 A1 | 5/2003 | Larsen et al. |
| 2003/0118703 A1 | 6/2003 | Nguyen et al. |
| 2003/0165604 A1 | 9/2003 | Tsubaki et al. |
| 2003/0203070 A1 | 10/2003 | Lin et al. |
| 2004/0013787 A1 | 1/2004 | Theuer |
| 2004/0048925 A1 | 3/2004 | Wiley et al. |
| 2004/0071825 A1 | 4/2004 | Lockwood |
| 2004/0106678 A1 | 6/2004 | Dobbins et al. |
| 2004/0122210 A1 | 6/2004 | Thim et al. |
| 2004/0202770 A1 | 10/2004 | Cain et al. |
| 2004/0220266 A1 | 11/2004 | Wiley et al. |
| 2004/0237466 A1 | 12/2004 | Grossmann et al. |
| 2004/0247755 A1 | 12/2004 | Doetsch et al. |
| 2004/0248771 A1 | 12/2004 | Raggi |
| 2005/0075280 A1 | 4/2005 | Larsen et al. |
| 2005/0106219 A1 | 5/2005 | Bortlik et al. |
| 2005/0215640 A1 | 9/2005 | Baxter et al. |
| 2005/0249650 A1 | 11/2005 | Johannes Damhuis et al. |
| 2006/0024385 A1 | 2/2006 | Pedersen |
| 2006/0193961 A1 | 8/2006 | Shastri et al. |
| 2006/0204632 A1 | 9/2006 | Barrett-Reis et al. |
| 2006/0286210 A1 | 12/2006 | Rangavajla et al. |
| 2006/0293220 A1 | 12/2006 | Holt |
| 2007/0093553 A1 | 4/2007 | Baxter et al. |
| 2007/0125785 A1 | 6/2007 | Robinson et al. |
| 2007/0142469 A1 | 6/2007 | Thomas et al. |
| 2007/0219146 A1 | 9/2007 | Bhaskaran et al. |
| 2008/0031860 A1 | 2/2008 | Hageman |
| 2008/0058415 A1 | 3/2008 | Shulman et al. |
| 2008/0119552 A1 | 5/2008 | Navarro |
| 2008/0193624 A1 | 8/2008 | Shulman et al. |
| 2008/0194407 A1 | 8/2008 | Ashmead et al. |
| 2008/0209864 A1 | 9/2008 | Fergusson et al. |
| 2008/0254153 A1 | 10/2008 | Wang et al. |
| 2008/0260923 A1 | 10/2008 | Kratky et al. |
| 2008/0274230 A1 | 11/2008 | Johns et al. |
| 2008/0305531 A1 | 12/2008 | Lam et al. |
| 2008/0317886 A1 | 12/2008 | Sparkman |
| 2009/0087540 A1 | 4/2009 | Haschke et al. |
| 2009/0110674 A1 | 4/2009 | Loizou |
| 2009/0142425 A1 | 6/2009 | Jager et al. |
| 2009/0220637 A1 | 9/2009 | Roessle |
| 2009/0263367 A1 | 10/2009 | Foley |
| 2010/0074969 A1 | 3/2010 | Hughes et al. |
| 2010/0179112 A1 | 7/2010 | Rathmacher et al. |
| 2011/0218244 A1 | 9/2011 | Kneller |
| 2011/0250322 A1 | 10/2011 | Johns et al. |
| 2011/0256272 A1 | 10/2011 | Johns et al. |
| 2011/0256297 A1 | 10/2011 | Johns |
| 2011/0256299 A1 | 10/2011 | Helmke |
| 2011/0256301 A1 | 10/2011 | Kensler et al. |
| 2011/0305799 A1 | 12/2011 | DeWille et al. |
| 2012/0258209 A1 | 10/2012 | Ulstad |
| 2012/0283185 A1 | 11/2012 | Whyte |

FOREIGN PATENT DOCUMENTS

| | | |
|---|---|---|
| CA | 2784605 | 6/2011 |
| CA | 2737972 | 10/2012 |
| CN | 101569412 | 11/2009 |
| CN | 101574146 | 11/2009 |
| CN | 101703246 | 5/2010 |
| DE | 29707308 | 6/1997 |
| DE | 29709313 | 9/1997 |
| EP | 0036663 | 9/1981 |
| EP | 0367724 | 9/1990 |
| EP | 0385859 | 9/1990 |
| EP | 0756827 | 2/1997 |
| EP | 0698078 | 8/1997 |
| EP | 0637239 | 8/1999 |
| EP | 1762147 | 3/2007 |
| EP | 1968564 | 9/2008 |
| EP | 2082738 A1 | 7/2009 |
| EP | 2461704 | 10/2013 |
| IN | 200800657 L1 | 9/2009 |
| JP | 05503508 | 6/1993 |
| JP | 7507569 | 8/1995 |
| JP | 9121809 | 5/1997 |
| JP | 11508282 | 7/1999 |
| JP | 2001288107 | 10/2001 |
| JP | 2002518440 | 6/2002 |
| JP | 20025211428 | 7/2002 |
| JP | 2003137790 | 5/2003 |
| JP | 2006136318 | 6/2006 |
| JP | 2009155336 | 7/2009 |
| WO | 9406417 | 3/1994 |
| WO | 9804253 | 2/1998 |
| WO | 9966917 | 12/1999 |
| WO | 0015174 | 3/2000 |
| WO | 20010107091 | 2/2001 |
| WO | 0156402 | 8/2001 |
| WO | 0158284 | 8/2001 |
| WO | 0177271 | 10/2001 |
| WO | 0217735 | 3/2002 |
| WO | 03053456 | 7/2003 |
| WO | 03091214 | 11/2003 |
| WO | 2004064715 | 8/2004 |
| WO | 2005000315 | 1/2005 |
| WO | 2005102301 | 11/2005 |
| WO | 2006062424 | 6/2006 |
| WO | 2007066232 | 6/2007 |
| WO | 2007/075605 | 7/2007 |
| WO | 2007/098092 | 8/2007 |
| WO | 2008115723 | 9/2008 |
| WO | 2009143097 | 11/2009 |
| WO | 2011074995 | 6/2011 |
| WO | 2011094544 | 8/2011 |
| WO | 2011094548 | 8/2011 |
| WO | 2011094549 | 8/2011 |
| WO | 2011094551 | 8/2011 |
| WO | 2011094557 | 8/2011 |
| WO | 2011156238 | 12/2011 |
| WO | 2012088075 | 6/2012 |
| WO | 2012097064 | 7/2012 |
| WO | 2012109105 | 8/2012 |
| WO | 2012112419 | 8/2012 |

OTHER PUBLICATIONS

Final rejection for U.S. Appl. No. 13/016,070 dated Apr. 4, 2013.
Amendment with RCE for U.S. Appl. No. 13/016,070 dated Jul. 2, 2013.
Applicant-Initiated Interview Summary for U.S. Appl. 13/016,005 dated Jul. 29, 2013.
Amendment and Response to Office Action for U.S. Appl. No. 13/016,005 dated Jul. 29, 2013.
Non-final office action for U.S. Appl. No. 13/151,911 dated Apr. 19, 2012.

(56) References Cited

OTHER PUBLICATIONS

Amendment and Response to Office Action for U.S. Appl. No. 13/151,911 dated Jul. 19, 2012.
Office Action from U.S. Appl. No. 13/151,911 dated Nov. 9, 2012.
Amendment from U.S. Appl. No. 13/151,911 dated Feb. 11, 2013.
Office action in U.S. Appl. No. 13/151,911 dated Jun. 7, 2013.
Amendment to Office Action for U.S. Appl. No. 13/016,248 dated Feb. 7, 2013.
Examiner's First Report from Australian Application No. 2006331950 dated Apr. 19, 2012.
Office action issued in Canadian Application No. 2,560,042 dated Nov. 14, 2011.
First Office Action from Chilean Application No. 192-2011 dated Apr. 24, 2013.
Office action from Chinese Application No. 200580009596.0 dated Jun. 28, 2010.
Office action from Chinese Application No. 200580009596.0 dated Jun. 9, 2011.
Office action from Chinese Application No. 200580009596.0 dated Mar. 1, 2012.
Office action from Chinese Application No. 200680047936.3 dated May 25, 2010.
Office action from Chinese Application No. 200680047936.3 dated Feb. 24, 2011.
English translation of Office action for Chinese Application No. 201110094963 dated Mar. 30, 2012.
English translation of 1st Office Action for Chinese Application No. 201180006376.8 dated May 13, 2013.
English translation of First Office Action for Chinese Application No. 201180007418.x (PCT/US2011/022938) dated Jun. 7, 2013.
English translation of First Office Action for Chinese Application No. 20118007420.7 (PCT/US2011/022932) dated Jun. 5, 2013 (received Jul. 5, 2013).
English translation of First Office Action for CN Application No. 201180007682.3 dated May 31, 2013 (received Jul. 8, 2013).
Search Report in EP Application No. 11187274.3 dated Feb. 15, 2012.
Notice of Allowance in EP Application No. 11705722.4 dated Nov. 15, 2012.
Intention to Grant in EP Application No. 11705723.2 dated Apr. 25, 2013.
Intention to Grant in EP Application No. 11705724.0 dated Nov. 29, 2012.
Decision to Grant in EP Application No. 11705724.0 dated Jun. 13, 2013.
Communication from EP Application No. 11705725.7 dated Sep. 5, 2012.
Communication from EP Application No. 11707733.9 dated Sep. 5, 2012.
First Examination Report in EP Application No. 11726580.1 dated Jan. 21, 2013.
Search Report in EP Application No. 10186645.7-1216 dated Feb. 14, 2011.
Search Report in EP Application No. 12382138.1 dated Jun. 14, 2012.
Extended Search Report in EP Application No. 12382138.1 dated Oct. 16, 2012.
Office action from Indian Application No. 1372/MUMNP/2008 dated Sep. 23, 2010.
First Hearing Notice in Indian Application No. 1372/MUMNP/2008 dated Nov. 4, 2011.
Second Hearing Notice in Indian Application No. 1372/MUMNP/2008 dated Mar. 10, 2012.
Office action from Japanese Application No. 2000-555603 dated Jan. 12, 2010.
Office action from Japanese Application No. 2000-555603 dated Feb. 15, 2011.
Office action from Japanese Application No. 2000-555603 dated Oct. 25, 2011.
English translation of notice of rejection in Japanese Application No. 2000-555603 dated Mar. 6, 2012.
Response in U.S. Appl. No. 13/016,005 dated Aug. 6, 2014.
Final Office Action in U.S. Appl. No. 13/016,005 dated Aug. 20, 2014.
Non Final Office Action for U.S. Appl. No. 13/016,059 dated Jul. 16, 2014.
Response for U.S. Appl. No. 13/016,059 dated Sep. 24, 2014.
Response to OA in U.S. Appl. No. 13/016,070 dated Aug. 19, 2014.
Final Office Action in U.S. Appl. No. 13/016,070 dated Sep. 16, 2014.
Non final Office Action for U.S. Appl. No. 13/151,911 dated Jul. 14, 2014.
Response with RCE in U.S. Appl. No. 13/440,610 dated Mar. 6, 2014.
Non final office action for U.S. Appl. No. 13/440,610 dated Sep. 3, 2014.
Office action in Canadian Application No. 2,785,524 dated Jul. 28, 2014.
Office action in Canadian Application No. 2,785,526 dated Aug. 15, 2014.
Intention to Grant in EP Application No. 11705725.7 dated Jul. 11, 2014.
Office Action in JP Application No. 2012-551324 dated Aug. 5, 2014.
Office Action in JP Application No. 2012-551322 dated Aug. 5, 2014.
Office Action in MX Application No. MX/a/2012/008783 dated Sep. 12, 2014.
Office Action in MX Application No. MX/a/2012/008785 mailed Aug. 29, 2014.
Office Action in MX Application No. MX/a/2012/008786 mailed Sep. 3, 2014.
English translation of Office Action and Search Report in TW Application No. 100103536 dated Jun. 30, 2014.
http://www.pedialyte.com/thisispedialyte/variety.cfm dated Jul. 2004.
http://www.pediasure.com/homepage.cfm dated Mar. 2005.
Evans et al., "Expression and activation of protein kinase C in eosinophils after allergen challenge," Am J. Physiol. Lung Cell Mole Physiol, vol. 277, pp. 233-239 (1999).
Fenteany et al., "Lactacystin, proteasome function and cell fate", J Biol. Chem., 1998, pp. 8545-8548, vol. 273, No. 15.
Ferrando et al., "Prolonged bed rest decreases skeletal muscle and whole body protein synthesis", Am J. Physiol., vol. 270, pp. E627-E633 (1996).
Flakoll et al., "Effect of b-hydroxy-b-methylbutyrate, arginine and lysine supplementation on strength, functionality, body composition, and protein metabolism in elderly women," Nutrition, vol. 20, pp. 445-451 (2004).
Fligger, et al., "Arginine supplementation increases weight gain, depresses antibody production and alters circulating leukocyte profiles in preruminant calves without affecting plasma growth hormone concentrations," J. Anim. Sci., vol. 75, pp. 3019-3025 (1997).
Frank, "Potential new medical therapies for diabetic retinopathy: protein kinase C inhibitors," American Journal of Opthamology, 2002 pp. 693-698, vol. 133, No. 5.
Fuller, et al., "Decreasing male broiler mortality by feeding the leucine catabolite b-hydroxy-b-methylbutyrate," Poult. Sci. vol. 73, Supplemental 1, p. 93 (1994).
Gacs et al., " Significance of Ca-Soap Formation for Calcium Absorption in the Rat," Gut, vol. 18, pp. 64-68 (1977).
Gallagher et al., "B-hydroxy-b-methylbutyrate ingestion, Part 1: Effects on strength and fat free mass," Med. Sci. Sports Exercise, vol. 32, No. 12, pp. 2109-2115 (2000).
Gallagher, et al. "B-hydroxy-b-methylbutyrate ingestion Part II: Effects on Hematology, hepatic and renal function," Med. Sci. Sports Exercise, vol. 32, No. 12, pp. 2116-2119 (2000).
Goekijan, "Protein kinase C in the treatment of disease: Signal transduction pathways, inhibitors, and agents in development," Current Medical Chemistry, vol. 6, No. 9, pp. 877-903 (1999).

(56) References Cited

OTHER PUBLICATIONS

Golubitskii, et al. "Stability of Ascorbic Acid in Aqueous and Aqueous-Organic Solutions for Quantitative Determination," Journal of Analytical Chemistry, vol. 62, No. 8, pp. 742-747 (2007).
Gomes-Marcondes et al., "Development of an in-vitro model system to investigate the mechanism of muscle protein catabolism induced by proteolysis-inducing factor," British Journal of Cancer, vol. 86, No. 10, pp. 1628-1633 (2002).
Learning Zone-HMB, www.interactivenutrition.com as of Dec. 29, 2004.
Hanson, et al., "Seven days of muscle re-loading and voluntary wheel running following hindlimb suspension in mice restores running performance, muscled morphology and metrics of fatigue but not muscle strength," Muscle Res. Cell Motil., vol. 31, pp. 141-153 (2010).
Hauber et al., "Expression of interleukin-4, interleukin-9 and interleukin-13 in perpheral blood mononuclear cells of cystic fibrosis patients with and without allergy," EXCLI Journal, vol. 5, pp. 209-216 (2006).
Haumann, "Structured Lipids Allow Fat Tailoring," International News on Fats, Oils, and Related Materials, vol. 8 (10), pp. 1044-1011 (1997).
Ho, et al. "Antioxidants, NFkappaB activation and diabetogenesis" Proceedings of the Society for Experimental Biology and Medicine, vol. 222, No. 3, pp. 205-213 (1999).
Huai, Ming Yan, "Progress in 2-4 methionine hydroxy butyric acid (HMB)," Foreign Animal Husbandry (Pigs and Poultry), Jun. 25, 2003.
Jagoe, "What do we really know about the ubiquitin-proteasome pathway in muscle atrophy?", Current Opinion in Clinical Nutrition and Metabolic Care, vol. 4, No. 3, pp. 183-190 (2001).
Jarowski, et al., "Utility of fasting essential amino acid plasma levels in formulation of nutritionally adequate diets III: Lowering of rat serum cholesterol levels by lysine supplementation," Journal of Pharmaceutical Sciences, vol. 64(4), pp. 690-691 (1975).
Jowko et al., "Creatine and b-hydroxy-b-methylbutyrate (HMB) additively increase lean body mass and muscle strength during a weight-training program," Nutrition, vol. 17, pp. 558-566 (2001).
Juven product information, http://abbottnutrition.com/Products/Juven dated 2010 5 pages.
Kaizen HMB, www.bodybuilding.com as of Dec. 29, 2004.
Kisner, "The Nutrition of the Cancer Patient," Cancer Treatment Reports, vol. 65, supplemental 5, pp. 1-2 (1981).
Knitter et al. "Effects of b-hydroxy-b-methylbutyrate on muscle damage after a prolonged run," Journal of Applied Physiology, vol. 89, pp. 1340-1344 (2000).
Komasio et al., "Beta hydroxy-beta-methylbutyrate (HMB) stimulates myogenic cell proliferation, differentiation and suvival via the MAPK/ERK and PI13K/Akt pathways," Biochimica et Biophysica Acta Molecular Cell Research, vol. 1793(5), pp. 755-763 (2009).
Kortebein et al., "Effect of 10 days of Bed Rest on Skeletal Muscle in Healthy Older Adults," JAMA, vol. 297, pp. 1772-1774 (2007).
Kreider, et al. "Effect of Calcium Beta-Hydroxy-Beta-Methylbutyrate (HMB) Supplementation During Resistance-Training on Markers of Catabolism, Body Composition and Strength," International Journal of Sports Medicine, vol. 20, No. 8, pp. 503-509 (Nov. 1, 1999).
Kritchevsky, "An international symposium on cancer cachexia, cytokines, and EPA: Introduction," Nutrition, Elsevier Inc., US vol. 12(1), p. S1 (1996).
Kutsuzawa, et al. "Muscle energy metabolism and nutritional status in patients with chronic obstructive pulmonary disease," American Journal of Respiratory and Critical Care Medicine, vol. 152, No. 2, pp. 647-652 (1995).
"Lean DynamX", XP 002670342, available at http://www.fitpage.de/produicte/pd-1330122620.htm?categoryId=181 (last accessed Feb. 24, 2012) (5 pages).
Lentsch et al., "Activation and Regulation of NFkB during Acute Inflammation", Clin. Chem. Lab. Med., vol. 37, No. 3, pp. 205-208 (1999).
Levenhagen et al., "Arginine, Lysine and b-hydroxymethylbutyrate (HMB) Supplementation Enhances the Efficiency of Protein Synthesis in Elderly Females," Nutrition Week Abstracts, vol. 75, pp. 4115-4125 (2002).
"Lite Protein Drinks", Database GNPD (Online) Mintel, Mar. 2000, XP002670334, available at gnpd.com.
"Lite Protein Drink Mixes with GlycerLEAN, " database GNPD (Online) Mintel, Feb. 2002, XP002670335, available at www.gnpd.com.
Lorite et al., "Activation of ATP-ubiquitin-dependent proteolysis in skeletal muscle in vivo and murine myoblasts in vitro by a proteolysis-inducing factor (PIF)," British Journal of Cancer, vol. 85, No. 2, pp. 297-302 (2001).
Macchi et al. "Influence of co-ingestion of glucose on b-hydroxy-b-methylbutyrate (HMB) metabolism in humans," FASEB J. p. A909 (1999).
MacDonald et al., "Understanding and Managing Cancer Cachexia,", Journal of the American College of Surgeons, vol. 197(1), 2003, pp. 143-161.
May, et al. "Reversal of cancer-related wasting using oral supplementation with a combination of beta-hydroxy-betamethylbutyrate, arginine, and glutamine," American Journal of Surgery, vol. 183, No. 4, 2002, pp. 471-479.
Meier, "Protein kinase C activation and its pharmacological inhibition in vascular disease", Vascular Medicine, vol. 5, No. 3, pp. 173-185 (2000).
Meletis et al., "Natural Supports for Gaining and Maintaining Muscle Mass," Alternative and Complementary Therapies, pp. 257-263 (2005).
MERCK Index No. 1862, 2003.
MERCK Index No. 5198, 2003.
MERCK Index No. 7355, 2003.
MERCK Index No. 9908, 2003.
MERCK Index No. 9975, 2003.
MERCK Manual, "Starving and Wasting," 16th Ed., pp. 919-920 (1995).
Miller et al., "The effect of intensive training and b-hydroxy-b-methylbutyrate (HMB) on the physiological response to exercise in horses" FASEB J. p. A290 (1997).
Milne et al., "Do Routine Oral Protein and Energy Supplements Improve Survival and Reduce Length of Hospital Stay for Elderly People", 2002 Nutrition Week Abstracts, p. 412S (2002).
Montanari et al., "Quality of Organic Coatings for Food Cans: Evaluation Techniques and Prospects of Improvement," Progress in Organic Coatings, vol. 29(1-4), pp. 159-165 (1996).
Moscat, "NF-kappaB activation by protein kinase C isoforms and B-cell function" Embo Reports, vol. 4, No. 1 pp. 31-36 (2003).
Moschini et al., "Effect of feeding b-hydroxy-b-methylbutyrate (HMB) on leucine and fat metabolism in mammary gland," FASEB J. p. A70 (1993).
Nawa et al., "A novel Akt/PKB-interacting protein promotes cell adhesion and inhibits familial amyotrophic lateral sclerosis-linked mutant SOD1-induced neuronal death via inhibition of PP2A-mediated dephosphorylation of Akt/PKB," Cellular Signalling, vol. 20(3), pp. 493-505 (2008).
Nissen et al., "b-hydroxy-b-methylbutyrate (HMB) supplementation in humans is safe and may decrease cardiovascular risk factors," J. of Nutrition, vol. 130, pp. 1937-1945 (2000).
Nissen et al., "Colostral milk fat percentage and pig performance are enhanced by feeding the leucine metabolite bhydroxy-b-methylbutyrate to sows," Journal of Animal Science, vol. 72, pp. 2331-2337 (1994).
Nissen et al., "Effect of b-hydroxy-b-methylbutyrate (HMB) supplementation of strength and body composition of trained and untrained males undergoing intense resistance training," FASEB J. p. A287 (1996).
Nissen et al., "Effect of dietary supplements on lean mass and strength gains with resistance exercise: A meta analysis," Journal of Applied Physiology, vol. 94, pp. 651-659 (2003).
Nissen et al., "Effect of feeding b-hydroxy-b-methylbutyrate (HMB) on body composition and strength of women," FASEB J. p. A150(1997).

(56) References Cited

OTHER PUBLICATIONS

Nissen et al., "Effect of leucine metabolite b-hydroxy-b-methylbutyrate on muscle metabolism during resistance-exercise training," Journal of Applied Physiology, vol. 81, No. 5, pp. 2095-2104 (1996).
Nissen et al. "Nutritional role of the leucine metabolite b-hydroxy-b-methylbutyrate (HMB)," Journal of Nutritional Biochemistry, vol. 8, pp. 300-311 (1997).
Nissen et al., "The effect of b-hydroxy-b-methylbutyrate on growth, mortality and carcass qualities of broiler chickens," Poultry Science, vol. 71, pp. 137-155 (1994).
Nissen et al., "The effects of the leucine catabolite, b-hydroxy-b-methylbutyrate (HMB) on the growth and health of growing lambs," Journal of Animal Science, p. 243 (1994).
Nonnecke, B. et al., "Leucine and its Catabolites After Mitogen-Stimulated DNA Synthesis by Bovine Lymphocytes," J. Nutr., 1991; 121:1665-1672.
O'Brian et al., "The tumor promoter receptor protein kinase C: A novel target for chemoprevention and therapy of human colon cancer", Prog. Clin. BioRes., vol. 391, pp. 117-120 (1995).
Oliver, et al., "Airway smooth muscle and asthma," Allergology International, vol. 55, pp. 215-223 (2006).
Orino, et al., "ATP dependent reversible association of proteasomes with multiple protein components to form 26S complexes that degrade ubiquitinated proteins in human HL-60 cells," FESB Letters, vol. 284, No. 2, pp. 206-210 (1991).
Ostaszewski, P. et al., "3-hydroxy-3-methylbutyric acid (HMB) in Immunological Reactions Generated by Nutritional Allergy in Guinea Pigs," Veterinary Medicine 51(2), 1995, pp. 100-102.
Ostaszewski, P. et al., 3-Hydroxy-3 Methylbutyrate (HMB) Fed in the Water Enhance Immune Response in Young Broilers, Abstract 96, 25 1998.
Ostaszewski, et al., "3-hydroxy-3methylbutyrated and 2-oxoisocaproate effect body composition and cholesterol concentration in rabbits," Journal of Animal Physiology and Animal Nutrition, vol. 79, pp. 135-145 (1998).
Ostasweski, P. et al, "The Immunomodulating Activity of Dietary 3-hydroxy-3methylbutyrate (HMB) in Weaning Pigs", J. Anim. Sci. 1998; 76 (Suppl. 1):136.
Ostasweski et al. "The leucine metabolite 3-hydroxy-3-methybutyrate (HMB) modifies protein turnover in muscles of laboratory rats and domestic chickens in vitro," Journal of Animal Physiology and Animal Nutrition, vol. 84, pp. 1-8 (2000).
Ostasweski et al, "The effect of the leucine metabolite 3-hydroxy-3-methylbutyrate (HMB) on muscle protein synthesis and protein breakdown in chick and rat muscle," Journal of Animal Science, vol. 74, Supplemental 1, p. 138 (1996).
Ostasweski et al. "Dietary supplementation of 3-hydroxy-3-methylbutyrate improved catch up growth in underfed lambs," Ann. Zootech. vol. 43, p. 308 (1994).
Panton et al. "Effect of b-hydroxy-b-methylbutyrate and resistance training on strength and functional ability in the elderly," Medicine and Science in Sports and Exercise, p. S194 (1998).
Panton et al., "Nutritional supplementation of the leucine metabolite b-hydroxy-b-methylbutyrate (HMB) during resistance training," Nutrition, vol. 16, pp. 734-739 (2000).
Papet, et al., "The effect of a high dose of 3-hydroxy-3-methylbutyrate on protein metabolism in growing lambs," British Journal of Nutrition, vol. 77, pp. 885-896 (1997).
Perkins, et al. "Good cop, bad cop: the different faces of NF-kB," Cell Death and Differentiation, vol. 13, pp. 759-772 (2006).
Peterson, A. et al., "In Vitro Exposure with B-Hydroxy-B-Methylbutyrate Enhances Chicken Macrophage Growth and Function," Veterinary Immunology and Immunopathology, 1999 67:67-68.
Peterson, A. et al., "Enhancement of Cellular and Humoral Immunity in Young Broilers by the Dietary Supplementation of B-Hydroxy-B-Methylbutyrate," Immunopharmacology and Immunotoxicity, 1999, 21(2), 307-330.

Portal et al., "Effect of HMB supplementation on body composition, fitness, hormonal profile and muscle damage indices," J. of Ped. Endo. & Meta., vol. 23(7), pp. 641-650 (2010).
Porter, CM et al., "Sustained NFAT Signaling Promotes a Th1-Like Pattern of Gene Expression in Primary Murine CD4+Tcells," J. of Immunology, 2002: 168: 4936-4945.
Pusptiasari et al., "Calcium Fortification of Cottage Cheese with Hydrocolloid Control of Bitter Flavor Defects", Journal of Dairy Science, vol. 74, pp. 1-7 (1991).
Rathmacher et al., Safety of a nutritional mixture of b-hydroxy-b-methylbutyrate (HMB), glutamine and arginine in healthy young adults and patients with AIDS, JPEN 23(1): S10 (1999).
Rathmacher, et al. "The Effect of the leucine metabolite b-hydroxy-b-methylbutyrate on lean body mass and muscle strength during prolonged bedrest" FASEB J. p. A909 (1999).
Rham et al., "Role of Ionic Environment in Insolubilization of Whey Protein During Heat Treatment of Whey Products," Journal of Dairy Science, vol. 67(5), pp. 939-949 (1984).
Rathmacher, et al., "Supplementation with a combination of beta-hydroxy-beta-methylbutyrate (HMB), arginine and glutamine is safe and could improve hematological parameters," J. of Parenteral and Enternal Nutrition, vol. 28, No. 2, p. 6575 (2004).
Sandberg et al., "Effect of b-hydroxy-b-methylbutyrate on the physiological response to exercise and conditioning in horses," Journal of Animal Science, p. 198 (1997).
Sandberg et al., "The effect of intensive training and b-hydroxy-b-methylbutyrate (HMB) on muscle glycogen concentration in the horse," J. of Animal Science, vol. 76, Supplemental 1, p. 175 (1998).
Schols, "Evidence for a relation between metabolic derangements and increased levels of inflammatory mediators in a subgroup of patients with chronic obstructive pulmonary disease," Thorax, vol. 51, No. 8, pp. 819-824 (1996).
Schols, "Pulmonary cachexia," International Journal of Cardiology, vol. 85, No. 1 pp. 101-110 (2002).
Shen Hua, "Development in the aseptic package", China Packaging Industry Mar. 31, 2006 [English abstract].
Siu, et al. "Id2 and p53 participate in apoptosis during unloading-induced muscle atrophy", Am. J. Physiol. Cell. Physiol., vol. 288, C1058-C1073 (2005).
Siwicki, A. et al., "Influence of 3-Hydroxy-3-Methylbutyrate (HMB) on Specific Cellular Immune Response After In Vitro and In Vivo Immunization with Yersinia ruckeri Antigen," J. Anim. Sci., 1998: 76 (Suppl. 1):136.
Siwicki, A. et al., "In VitroEffects of 3-Hydroxy-3-Methylbutyrate (HMB) on Measures of Immune Function and Immunocompetence in Fish", J.Anim.Sci., 1998: 76 (Suppl. 1) 136.
Siwicki, A. et al., "Immunomodulating Effect of 3-Hydroxy-3-Methylbutyrate (HMB) on the Nonspecific Cellular and Humoral Defense Mechanisms in Rainbow Trout (*Oncorhynchus mykiss*)", J. Anim. Sci., 1998; 76 (Suppl. 1) 137.
Smart, et al., "Polyclonal and allergen-induced cytokine responses in adults with asthma: Resolution of asthma is associated with normalization of IFN-y-responses," Journal of Allergy and Clinical Immunology, vol. 110, pp. 450-456.
Smith, H. et al., "Attenuation of proteasome-induced proteolysis in skeletal muscle by beta-hydroxy-betamethylbutyrate in cancer-induced muscle loss," Cancer Research, 65(1), Jan. 2005, pp. 277-283.
Smith et al., "Mechanisms of the attenuation of proteolysis-inducing factor stimulated protein degradation in muscle by beta-hydroxy-beta-methylbutyrate" Cancer Research, pp. 8731-8735 (2004).
Smith et al., "Effect of a cancer cachectic factor on protein synthesis/degradation in murine C2C12 myoblasts: modulation by eicosapentaenoic acid" Cancer Research, vol. 59, No. 21, pp. 5507-5513 (1999).
Smith et al., "Signal transduction pathways involved in proteolysis-inducing factor induced proteasome expression in murine myotubes", British Journal of Cancer, vol. 89, No. 9, pp. 1783-1788 (2003).
Sult, "Th1/Th2 Balance: A Natural Therapeutic Approach to Th2 Polarization in Allergy," Applied Nutritional Science Reports, vol. 676, pp. 1-8, 2003.

(56) References Cited

OTHER PUBLICATIONS

Takabatake et al, "Circulating leptin in patients with chronic obstructive pulmonary disease,", American Journal of Respiratory and Critical Care Medicine, vol. 159, pp. 1215-1219 (1999).
Talleyrand, V. et al., "Effect of Feeding B-Hydroxyl-B-Methylbutyrate on Immune Function in Stressed Calves," FASEB J. 1994: 8:A951.
Talleyrand et al., "Uptake and output of the leucine metabolite b-hydroxy-b-methylbutyrate (HMB) across the legs of pigs," FASEB J., p. A71 (1993).
Tanaka et al., "Effects of the novel Foxo 1 inhibitor AS1708727 on plasma glucose and trigyceride levels in diabetic db/db mice," Euro. Jour. of Pharm., vol. 645(1-3), pp. 185-191 (2010).
Teixeira et al., "The role of interferon-c on immune and allergic responses, " Memorias do Instituto Oswaldo Cruz, vol. 100, (Suppl. 1) pp. 137-144 (2005).
Tisdale, et al., "Inhibition of Weight Loss by w-3 Fatty Acids in an Experimental Cachexia Model," Cancer Research, vol. 50, pp. 5022-5026 (1990).
Tisdale et al., "Inhibition of lipolysis and muscle protein degradation by epa in cancer cachexia," Nutrition, Elsevier Inc., US vol. 12(1), pp. S31-S33 (1996).
Todorov et al., "Characterization of a cancer cachectic factor," Nature, vol. 379, No. 6567, pp. 739-742 (1996).
Todorov et al., "Induction of muscle protein degradation and weight loss by a tumor product," Cancer Research, vol. 56, No. 6, pp. 1256-1261 (1996).
Toelstede et al., "Quantitative Studies and Taste Re-Engineering Experiments Toward the Decoding of the Nonvolatile Sensometabolome of Gouda Cheese," Journal of Agricultural and Food Chemistry, vol. 56, pp. 5299-5307 (2008).
Toelstede et al. "Sensomics Mapping and Identification of the the Key Bitter Metabolites in Gouda Cheese," Journal of Agricultural and Food Chemistry, vol. 56, pp. 2795-2804 (2008).
Toker, "Signaling through protein kinase C", Frontiers in Bioscience, vol. 3, pp. 1134-1147 (1998).
Tordoff et al., "Vegetable bitterness is related to calcium content", Appetite, vol. 52, pp. 498-504 (2009).
Van Koervering et al., "Effect of b-hydroxy-b-methylbuyrate on the health and performance of shipping stressed calves," The Oklahoma State Animal Science Research Report, pp. 312-316 (1993.
Van Koevering et al., "Effects of b-hydroxy-b-methylbutyrate on performance and carcass quality of feedlot steers," J. of Animal Science, vol. 72, pp. 1927-1935 (1994).
Van Koevering et al., "Oxidation of leucine and a-ketoisocaproate to b-hydroxy-b-methylbutyrate in vivo" American Journal of Physiology, pp. E27-E31 (1992).
Vukovich, et al. "Body composition of 70-year old adults responds to dietary beta-hydroxy-beta-methylbutyrate similarly to that of young adults", Journal of Nutrition, vol. 131, No. 7, pp. 2049-2052 (2001).
Vukovich, et al., "Effect of beta-hydroxy-beta-methylbutyrate on the onset of blood lactate accumulation and VO2 peak in endurance-trained cyclists," Journal of Strength and Conditioning Research, vol. 15, No. 4, pp. 491-497 (2001).
Vukovich, et al., "The Effect of dietary b-hydroxy-b-methylbutyrate (HMB) on strength gains and body composition in older adults", FASEB J. p. A376 (19997).
Waalkes, "A fluorometric method for the estimation of tyrosine in plasma and tissues," J. of Laboratory and Clinical Medicine, vol. 50, No. 51, pp. 733-736 (1957).
Watchorn et al, "Proteolysis-inducing factor regulates hepatic gene expression via the transcription factor NFkappaB and STST3," FASEB Journal, vol. 15, No. 3, pp. 562-564 (2001).
Whitehouse et al., "Induction of protein catabolism in myotubes by 15(S)-hydroxyeicosatetraenoic acid through increased expression of the ubiquitin-proteasome pathway," British Journal of Cancer, vol. 89, No. 4, pp. 737-745 (2003).
Whitehouse et al., "Increased expression of the ubiquitin-proteosome pathway in murine myotubes by proteolysis-inducing factor (PIF) is associated with activation of the transcription factor NF-kappaB," British Journal of Cancer, vol. 89, No. 6, pp. 1116-1122 (2003).
Williams, et al., "Effect of a specialized amino acid mixture on human collagen deposition," Annals of Surgery, vol. 236, No. 3, pp. 369-375 (2002).
Witte, et al., "Nutritional abnormalities contributing to cachexia in chronic illness", International Journal of Cardiology, vol. 85, pp. 23-31 (2002).
Wolf et al., "The mitogen-activated protein kinase signaling cascade: from bench to bedside," IMAJ, vol. 4, No. 8, pp. 641-647 (2002).
Xu Sheng, "Evaluation of safety of hydrogen peroxide sterilization in aseptic packaging systems", Beverage Industry, vol. 9, Issue 7 Dec. 31, 2006 [English abstract].
Zachwieja, et al. "Effect of the Leucine Metabolite b-hydroxy-b-methylbutyrate on muscle protein synthesis during prolonged bedrest," FASEB Abstracts, p. A1025 (1999).
Zarahevsky, et al. "Recovery of muscles of old rats after hindlimb immobilisation by external fixation is impaired compared with those of young rats," Exp. Gerontol., vol. 36, pp. 125-140 (2001).
Zdychova et al., "Emerging role of Akt Kinase/Protein Kinase B signaling in pathophysiology of diabetes and its complications," Physiol. Res. vol. 54(1), pp. 1-16 (2005).
Zhang et al., "Occurrence of beta-hydroxy-beta-methylbutyrate in foods and feeds," FASEB J. vol. 8(4-5) p. A464 (Abstract 2685) (1994).
Zhang, et al., "Change in plasma b-hydroxy-b-methylbutyrate (HMB) by feeding leucine, a-ketoisocaproate and isovaleric acid to pigs," FASEB J., p. A392 (1993).
Zuljdgeest-Van Leeuwen et al., "Inhibition of lipolysis by eicosapentaenoic acid in weight-losing cancer patients and healthy volunteers," Clinical Nutrition, Churchill Livingstone, London, GB vol. 17, p. 13 (1998).
English translation for First Office Action for CN Application No. 201180007700.8 dated May 28, 2013 (received Jul. 10, 2013).
Rowlands, et al., "Effects of b-hydroxy-b-methylbutyrate supplementation during resistance training on strength, body composition, and muscle damage in trained and untrained young men: a meta-analysis," J. of Strength and Conditioning Research, 23(3) 2009, pp. 836-846.
Final Office action for U.S. Appl. No. 13/016,005 dated Sep. 12, 2013.
Response after Final with Terminal Disclaimer in U.S. Appl. No. 13/016,005 filed Dec. 9, 2013.
Non Final Office Action for U.S. Appl. No. 13/016,005 dated Dec. 27, 2013.
Notice of Abandonment for U.S. Appl. No. 13/016,041 dated Oct. 21, 2013.
Non-final office action for U.S. Appl. No. 13/016,070 dated Dec. 17, 2013.
Amendment with RCE, Affidavit for U.S. Appl. No. 13/151,911 dated Oct. 18, 2013.
Office action in U.S. Appl. No. 13/440,610 dated Apr. 11, 2013.
Response to office action for U.S. Appl. No 13/440,610 dated Apr. 23, 2013.
Office Action for U.S. Appl. No. 13/440,610 dated May 9, 2013.
Response to OA for U.S. Appl. No. 13/440,610 dated Aug. 9, 2013.
Final Office Action in U.S. Appl. No. 13/440,610 dated Dec. 6, 2013.
English translation of First Office Action for CN Application No. 201180028614.5 (PCT/US2011/039170) (05174) dated Oct. 11, 2013 (received Nov. 20, 2013).
English translation of 2nd Office Action in Chinese Application No. 201180006376.8 dated Jan. 13, 2014.
English translation of Second Office Action for Chinese Application No. 20118007420.7 dated Jan. 16, 2014.
Extended Search Report in EP Application No. 11187274.3 dated Jun. 28, 2012.
Office Action in EP Application No. 11187274.3 dated Aug. 6, 2012.
Communication from EP Application No. 11705725.7 dated Jan. 24, 2014.

(56) References Cited

OTHER PUBLICATIONS

Communication in EP Application No. 11726580.1 dated Dec. 10, 2013.
First Substantive Examination Report for SA Application No. 111320139 received Dec. 19, 2013.
Von Bockelmann, Bernhard et al., "Aseptic Packaging of Liquid Food Products: A Literature Review", Journal of Agricultural and Food Chemistry, May 1986, vol. 34, issue 3, pp. 384-392.
"Yahoo Answers" ("What age did you start giving your baby whole milk ?"), pub. online 2008. http://answers.yahoo.com/question/index?qid=20080819094659AA0urJT.
Reexamination Notice from Chinese Application No. 200580009596.0 dated Jul. 9, 2013.
Intention to Grant in EP Application No. 11705722.4 dated Jan. 3, 2014.
"Body Core Strength" ("Calorie Facts"), pub. online Apr. 25, 2010. http://web.archive.org/web/20100425070417/http://bodycorestrength.com/calorie-facts/.
The Dairy Council ("The Nutritional Composition of Diary Products"), pub. online Jul. 2007—see pp. 3,5, and 7. The nutrional information from the 2002 summary edition of the Composition of Foods (Food Standards Agency (2002)) McCance and Widdowson's The Composition of Foods, 6th Summary Edition).
Google search—"How much fat is in skim milk ?"http://www.google.com/ . . . =how+much+fat+is+in+skim&gs . . . , last accessed May 3, 2013.
"Milk Composition Proteins", "Milk Composition & Synthesis Resource Library", pub. online Oct. 19, 2009. http://web.archive.org/web/20091019072335/http://classes.ansci.illinois.edu/ansc438/milkcompsynth/milkcomp_protein.html.
Notice of Appeal in U.S. Appl. No. 13/016,005 dated Nov. 20, 2014.
Appeal Brief for U.S. Appl. No. 13/016,005 dated Jan. 29, 2015.
Request for Reconsideration in U.S. Appl. No 13/016,070 dated Jan. 15, 2015.
Office Action in U.S. Appl. No 13/016,070 dated Mar. 3, 2015.
Notice of Allowance in U.S. Appl. No 13/016,248 dated Oct. 7, 2014.
Response to Office Action for U.S. Appl. No 13/151,911 dated Oct. 14, 2014.
Office Action for U.S. Appl. No. 13/151,911 dated Nov. 6, 2014.
Response with RCE in U.S. Appl. No 13/151,911 dated Feb. 20, 2015.
Applicant-Initiated Interview Summary and Advisory Action for U.S. Appl. No 13/151,911 dated Mar. 5, 2015.
Response to Mar. 5, 2015 Advisory Action for U.S. Appl. No 13/151,911 dated Mar. 6, 2015.
Applicant-Initiated Interview in U.S. Appl. No 13/440,610 dated Dec. 10, 2014.
Request for Reconsideration after Non-Final Rejection in U.S. Appl. No 13/440,610 dated Jan. 5, 2015.
Final Office Action in U.S. Appl. No 13/440,610 dated Jan. 30, 2015.
English translation of Third Office Action for CN Application No. 201180028614.5 dated Sep. 29, 2014.
Decision of Rejection for CN Application No. 20118007418.x dated Jan. 16, 2015.
English translation of Fourth Office Action for Chinese Application No. 20118007420.7 dated Dec. 1, 2014.
English translation of Third Office Action for Chinese Application No. 20118007700.8 dated Aug. 21, 2014 (received Sep. 25, 2014).
Decision to Grant in EP Application No. 11705725.7 dated Dec. 18, 2014.
Intention to Grant in EP Application No. 11726580.1 dated Sep. 18, 2014.
Decision to Grant in EP Application No. 11726580.1 dated Feb. 5, 2015.
EESR in EP 14169084.2 dated Sep. 22, 2014.
Office Action in JP Application No. 2012-551325 date Sep. 2, 2014.
Office Action in JP Application No. 2012-551326 dated Sep. 2, 2014.

Office Action in JP Application No. 2012-551329 dated Sep. 2, 2014.
Office Action in JP Application No. 2013-514238 mailed Nov. 11, 2014.
Gharsallaoui et al., "Applications of spray-drying in microencapsulation of food ingredients: an overview,", Food Research International, 40 (2007) pp. 1107-1121.
English translation of second Office Action in TW Application No. 100103536 dated Oct. 17, 2014.
Final office action in U.S. Appl. No. 13/016,059 dated Jan. 20, 2015.
Office Action for CA Application No. 2,801,339 dated Feb. 27, 2015.
Response to Notification of Non-Compliant Appeal Brief in U.S. Appl. No. 13/016,005 dated Apr. 2, 2015.
Response to Office Action for U.S. Appl. No. 13/016,005 dated Mar. 20, 2014.
Office Action dated Apr. 10, 2014 acknowledging entry of Mar. 20, 2014 response to Dec. 27, 2013 Office Action for U.S. Appl. No. 13/016,005.
Final Office Action in U.S. Appl. No. 13/016,005 dated Apr. 10, 2014.
Amendment in U.S. Appl. No. 13/016,070 dated Apr. 7, 2014.
Office Action in U.S. Appl. No. 13/016,070 dated May 21, 2014.
Office action issued in Canadian Application No. 2,785,522 dated May 1, 2014.
Office action issued in Canadian Application No. 2,785,523 dated May 21, 2014.
Office action issued in Canadian Application No. 2,785,528 dated May 14, 2014.
Office action in Canadian Application No. 2,801,339 dated May 26, 2014.
English translation of Second Office Action for CN Application No. 2011800286145 (PCT/US2011/039170) dated May 20, 2014 (received Jun. 9, 2014).
English translation of Second Office Action for Chinese Application No. 20118007418.x (PCT/US2011/022938) dated Mar. 24, 2014.
English translation of Third Office Action for Chinese Application No. 20118007420.7 dated May 15, 2014.
Second Office Action for CN Application No. 201180007682.3 dated Mar. 18, 2014.
English translation of Second Office Action for Chinese Application No. 201180007700.8 dated Feb. 8, 2014 (received Mar. 13, 2014).
Decision to Grant in EP Application No. 11705722.4 dated Apr. 25, 2014.
Intention to Grant in EP Application No. 11707733.9 dated Dec. 18, 2013.
Decision to Grant in EP Application No. 11707733.9 dated May 15, 2014.
Communication in EP Application No. 11726580.1 dated Mar. 24, 2014.
Examination Report for SG Application 201208825-8 dated Oct. 4, 2013.
Gao Fucheng et al., "Microcapsulation granulation Technology," New and High Technology of Modern Food Engineering, China Light Industry Press, pp. 51-53 and 58 (May 31, 1997), with summary in English on final page.
Applicant-Initiated Interview Summary in U.S. Appl. No. 13/016,005 dated Jun. 19, 2014.
International Search Report and Written Opinion from PCT/US2006/048303 dated May 6, 2008.
International Search Report from PCT/US2005/007951 dated Aug. 24, 2006.
Written Opinion from PCT/US2005/007951 dated Oct. 6, 2006.
International Search Report and Written Opinion for PCT/US2011/022928 dated May 23, 2011.
International Search Report and Written Opinion for PCT/US2011/022932 dated May 23, 2011.
International Search Report and Written Opinion for PCT/US2011/022938 dated May 23, 2011.
International Preliminary Report on Patentability for International Application PCT/US2011/022938 dated Jan. 25, 2012.
International Search Report and Written Opinion for PCT/US2011/022947 dated May 23, 2011.

(56) References Cited

OTHER PUBLICATIONS

International Preliminary Report on Patentability for International Application PCT/US2011/022947 dated Feb. 15, 2012.
International Search Report and Written Opinion for PCT/US2011/022935 dated May 23, 2011.
International Search Report and Written Opinion for PCT/US2011/039170 dated Aug. 3, 2011.
International Search Report and Written Opinion for PCT/US2011/066096 dated Mar. 14, 2012.
International Search Report and Written Opinion for PCT/US2012/020941 dated Apr. 26, 2012.
International Search Report and Written Opinion for International Application No. PCT/US2012/023767 dated Jun. 6, 2012.
International Search Report and Written Opinion for International Application No. PCT/US2012/024817 dated Jun. 6, 2012.
Office action for U.S. Appl. No. 11/025,466 dated Aug. 17, 2007.
Office action for U.S. Appl. No. 11/025,466 dated May 5, 2008.
Office action for U.S. Appl. No. 11/025,466 dated Dec. 5, 2008.
Office action for U.S. Appl. No. 11/025,466 dated Jun. 25, 2009.
Office action for U.S. Appl. No. 11/025,466 dated Apr. 14, 2010.
Office action for U.S. Appl. No. 11/025,466 dated Oct. 4, 2010.
Office action for U.S. Appl. No. 11/025,466 dated Apr. 6, 2011.
Office action for U.S. Appl. No. 11/025,466 dated Sep. 8, 2011.
Office action for U.S. Appl. No. 11/025,466 dated Feb. 10, 2012.
Office action for U.S. Appl. No. 11/641,978 dated Feb. 26, 2008.
Office action for U.S. Appl. No. 11/641,978 dated Mar. 3, 2009.
Office action for U.S. Appl. No. 11/641,978 dated Oct. 20, 2009.
Office action for U.S. Appl. No. 11/641,978 dated Jun. 7, 2010.
Office action for U.S. Appl. No. 13/016,005 dated Jan. 27, 2012.
Response to Office Action for U.S. Appl. No. 13/016,005 dated Apr. 27, 2012.
Office action for U.S. Appl. No. 13/016,005 dated Jun. 1, 2012.
Amendment and Response with RCE for U.S. Appl. No. 13/016,005 dated Aug. 31, 2012.
Applicant-Initiated Interview Summary for U.S. Appl. No. 13/016,005 dated Sep. 6, 2012.
Non-final office action for U.S. Appl. No. 13/016,005 dated Mar. 28, 2013.
Office action in U.S. Appl. No. 13/016,248 dated Nov. 7, 2012.
Notice of Allowance for U.S. Appl. No. 13/016,248 dated Apr. 22, 2013.
Office action for U.S. Appl. No. 13/016,041 dated Feb. 3, 2012.
Amendment A to U.S. Appl. No. 13/016,041 dated May 2, 2012.
Final office action for U.S. Appl. No. 13/016,041 dated Jun. 8, 2012.
Office action from Japanese Application No. 2007-504991 dated Jun. 21, 2011.
Second Office action from Japanese Application No. 2007-504991 dated Mar. 13, 2012.
Translation of Notice of Rejection for Japanese Patent Application No. 2008-547409 dated Jun. 5, 2012.
English translation of Notice of Preliminary Rejection for Korean Application No. 10-2006-7022383 dated Feb. 13, 2012.
Examination Report from Malaysian Appl. No. PI20082097 dated Jul. 29, 2011.
Examination Report from New Zealand Appl. 568611 dated Apr. 13, 2010.
Examiner's Second Report from New Zealand Appl. 568611 dated Jun. 3, 2011.
Examiner's First Report from New Zealand Application No. 593182 dated Jun. 3, 2011.
Examination Report issued in New Zealand Application No. 599371 dated Apr. 20, 2012.
Office action issued in Phillipines Application No. 12006501893 dated Oct. 11, 2011.
Office action issued in Phillipines Application No. 1-2008-501331 dated Apr. 4, 2012.
Office action from Russian Application No. 2008129605 dated Jul. 5, 2011.
Office action from Russian Application No. 2008129605 dated Aug. 12, 2011.
Office action in Taiwan Application No. 094109357 dated Dec. 2, 2010.
Office action in Taiwan Application No. 094109357 dated Jun. 24, 2011.
English translation of office action for Taiwan patent application No. 095147808 dated Mar. 21, 2012.
Examination Report for Vietnam Application No. 1-2006-01765 dated Aug. 18, 2011.
Abbott, "HMB (Beta-hydroxy-beta-methylbutyrate): A Scientific Review," Apr. 2010, pp. 1-34, XP002670332, available at http://abbottnutrition.com/downloads/resourcecenter/hmb-a-scientific-review.pdf (last accessed Apr. 9, 2012).
Aggarwal et al., "Suppression of the nuclear factor kB activation pathway by spice-derived phytochemicals: Reasoning for Seasoning", Annals of the New York Academy of Science, vol. 1030, pp. 434-441 (2004).
AIDS Alert, 1999, vol. 14, No. 4, pp. 41-43.
Alon et al., "Supplementing with beta-hydroxy-beta-methylbutyrate (HMB) to build and maintain muscle mass: a review," Research Communications in Molecular Pathology and Pharmacology, vol. 111 (1-4), pp. 139-151 (2002).
Andela et al., "NFkappaB: A pivotal transcription factor in prostate cancer metastasis to bone," Clinical Orthopaedics and Related Research, vol. 415S, pp. S75-S85 (2003).
Andrews, et al. "A rapid micropreparation technique for extraction of DNA-binding proteins from limiting numbers of mammalian cells," Nucleic Acids Research, vol., 19, No. 9, p. 2499 (1991).
Anonymous, "Reload Dietary Supplements," Database GNPD (online) Mintel, May 2010, XP002676291 available at www.gnpd.com.
Ballard et al., "Effect of L-glutamine supplementation on impaired glucose regulation during intravenous lipid administration," Nutrition, vol. 12(5), pp. 349-354 (1996).
Barber et al., "The effect of an oral nutritional supplement enriched with fish oil on weight-loss in patients with pancreatic cancer", British Journal of Cancer, vol. 81, No. 1 pp. 80-86 (1999).
Barnes et al. "NF kappa B: a pivotal role in asthma and a new target for therapy," Trends in Pharmacological Sciences, 1997, pp. 46-50 vol. 18.
Battaini, "Protein kinase C isoforms as therapeutic targets in nervous system disease states," Pharmacological Research, vol. 44, No. 5, pp. 353-361 (2001).
Beck et al., "Anticachectic and Antitumor Effect of Eicosapentaenoic Acid and its Effect on Protein Turnover," Cancer Research, vol. 51, pp. 6089-6093 (1991).
Bibby et al., "Characterization of a transplantable adenocarcinoma of the mouse colon producing cachexia in recipient animals," Journal of the National Cancer Institute, vol. 78, No. 3 pp. 539-546 (1987).
Brennan et al., "Nitrogen Metabolism in Cancer Patients," Cancer Treatment Reports, vol. 65, supplemental 5, pp. 67-78 (1981).
Burke, R., "Inhibition of mitogen-activated protein kinase and stimulation of Akt kinase signaling pathways: Two approaches with therapeutic potential in the treatment of neurodegenerative disease," Pharm. and Therap., vol. 114 (3), pp. 261-277 (2007).
"Calorie Counter" (Calories in Infant Formula, Abbott Nutrition, Similac, Advance with iron, liquid concentrate, not reconstituted), pub. online Jan. 17, 2010. http://web.archive.org/web/20100117072138/http://acaloriecounter.com/food/infant-formula-abbott-nutrition-similac-advance-wth-iron-liquid-concentrated-not-reconstituted-formerly-ross-.
Campbell, et al. "Allergic humans are hyporesponsive to a CXCR3 ligand-mediated Th1 immunity-promoting loop" FASEB Journal, vol. 18, pp. 329-331 (2004).
Carter "Protein Kinase C as a drug target: Implicaitons for drug or diet prevention and treatment of cancer," Current Drug Targets, vol. 12, No. 2, pp. 163-183 (2000).
Case Study: Water Purification Plant Installed at New UK Power Station, Filtration and Separation (Dec. 2004).
Charbonneau, "Recent case histories of food product-metal container interactions using scanning electron microscopy-x-ray microanalysis," Scanning, vol. 19(7), pp. 512-518 (1997).

(56) References Cited

OTHER PUBLICATIONS

Choi, et al., "Hematein inhibits atherosclerosis by inhibition of reactive oxygen generation and NF-kappB-dependent inflammatory mediators in hyperlipidemic mice," Journal of Cardiovascular Pharmacology, 2003, vol. 42(2), pp. 287-295.

Clark, RH et al., "Nutritional Treatment for Acquired Immunodeficiency Virus-Associated Wasting Using Beta-Hydroxy Beta-Methylbutyrate, Glutamine and Arginine: a Randomized, Double-Blind, Placebo-Controlled Study," J. Parenter Enteral Nutr. 2000; 24 (3) 133-139.

Clinical Infectious Diseases, vol. 25(2), p. 457 (1997).

Coffman et al., "Syntheses by Free-radical Reactions. V. a New Synthesis of Carboxylic Acids," Journal of the American Chemical Society , vol. 80, pp. 2282-2887 (1958).

Damjanac et al., "Dissociation of Akt/PKB and ribosomal S6 kinase signaling markers in a transgenic mouse model of Alzheimer's disease," Neurobiology of Disease, vol. 29(2), pp. 354-367 (2008).

Delfino, "Hormonal regulation of the NF-kappaB signaling pathway", Molecular and Cellular Endocrinology, vol. 157, Nos. 1-2, pp. 1-9 (1999).

De Los Reyes, et al., "Overview of resistance training, diet, hormone replacement and nutritional supplements on age-related sarcopenia-a minireview," Res. Comm. in Mol. Path. and Pharm., vol. 113-114, pp. 159-170 (2003).

de Maat, et al., "Inflammation, Thrombosis and Atherosclerosis: Results of the Glostrup Study," Journal of Thrombosis and Haemostasis, 2003, vol. 1, No. 5, pp. 950-957.

Dentener et al., "Systemic anti-inflammatory mediators in COPD: increase in soluble interleukin 1 receptor II during treatment of exacerbations," Thorax, vol. 56, No. 9, pp. 721-726 (2001).

Elam et al., "Effects of arginine and ornithine on strength, lean body mass and urinary hydroxyproline in adult males," Journal of Sports Medicine and Physical Fitness, vol. 29(1), pp. 52-56 (1989).

Engel, et al., "Evolution of the Composition of a Selected Bitter Camembert Cheese during Ripening: Release and Migration of Taste-Active Compounds," Journal of Agricultural and Food Chemistry, vol. 49, pp. 2940-2947 (2001).

Engel, et al., "Evolution of the Taste of a Bitter Camembert Cheese During Ripening: Characterization of a Matrix Effect," Journal of Agricultural and Food Chemistry, vol. 49, pp. 2930-2939 (2001).

Notice of Appeal in U.S. Appl. No. 13/016,070 dated Jun. 2, 2015.

Appellant's Brief Under 37 CFR§ 41.37 dated Jun. 30, 2015 in U.S. Appl. No. 13/016,070.

Office Action for U.S. Appl. No. 13/151,911 dated Apr. 13, 2015.

Notice of Allowance in Canadian Application No. 2,785,524 dated Apr. 21, 2015.

English translation of Decision on Rejection for Chinese Application No. 20118007700.8 dated May 4, 2015.

Decision of Rejection for JP Application No. 2012-551324 dated Apr. 7, 2015 (English translation received May 20, 2015).

English translation of Office Action in TW Application No. 100103533 dated May 6, 2015.

English translation of Search Report in TW Application No. 100103537 dated May 2, 2015.

English translation of Office Action in TW Application No. 100103537 dated May 8, 2015.

English translation of Search Report in TW Application No. 100103533 dated Apr. 28, 2015.

Amendment with RCE for U.S. Appl. No. 13/016,059 dated Apr. 20, 2015.

METHOD OF PREPARING A NUTRITIONAL POWDER COMPRISING SPRAY DRIED HMB

CROSS-REFERENCE TO RELATED APPLICATIONS

This application is a continuation-in-part of, claims priority to, and any other benefit of, U.S. application Ser. No. 13/016,041, filed Jan. 28, 2011, now abandoned, which claims priority to and any other benefit of U.S. Provisional Application Ser. No. 61/299,632, filed Jan. 29, 2010, the entire disclosures of both applications being incorporated herein in their entirety by reference.

FIELD

The present disclosure relates generally to nutritional powders and more particularly to nutritional powders comprising spray dried beta-hydroxy-beta-methylbutyrate (HMB).

BACKGROUND

Beta-hydroxy-beta-methylbutyrate (HMB) is a naturally occurring amino acid metabolite that is known for use in a variety of nutritional products and supplements. HMB is commonly used in such products to help build or maintain healthy muscle in selected individuals.

HMB is a metabolite of the essential amino acid leucine and has been shown to modulate protein turnover and inhibit proteolysis. In most individuals, muscle converts approximately 5% of available leucine to HMB, thus producing about 0.2 to about 0.4 grams of HMB per day in a 70 kg male. In studies where various kinds of stress were induced in animals, HMB supplementation increased lean mass. Clinical studies also suggest that HMB has at least two functions in recovery from illness or injury including protection of lean mass from stress-related damage and enhancement of protein maintenance or synthesis. It has been suggested that HMB may also be useful for enhancing immune function, reducing the incidence or severity of allergy or asthma, reducing total serum cholesterol and low density lipoprotein cholesterol, increasing the aerobic capacity of muscle, and other uses.

Since HMB is most often administered to individuals to support the development and maintenance of muscle mass and strength, many HMB products have been formulated with additional nutrients that may also be helpful in promoting healthy muscle. Some of these HMB products contain additional nutrients such as fat, carbohydrate, protein, vitamins, minerals and so forth. Calcium HMB is a commonly used form of HMB when formulated in oral nutritional products, which products include tablets, capsules, reconstitutable powders, and nutritional liquids and emulsions. Reconstitutable powders are particularly useful in this regard because such powders are often more shelf-stable than their liquid counterparts for extended periods even when formulated with multiple ingredients such as amino acids, carbohydrates, protein, and fat. These powders, however, often give off an undesirable aroma or odor, which is especially pronounced in the headspace of packaged product immediately after opening prior to use.

There is therefore a need for nutritional powders comprising HMB that are substantially free of undesirable aromas and off odors, especially when packaged and stored for extended periods.

One technique for preparing such nutritional powders is spray drying the powder. This technique involves preparing a liquid or a slurry of the nutritional composition, and spray drying the liquid or slurry to form the nutritional powder. However, the presence of calcium HMB creates stability issues in the liquids or slurries used in the preparation of the powders. In particular, in such liquids or slurries, the calcium will disassociate from the HMB and interact with the protein present in the formulation, resulting in protein aggregation and sedimentation in the slurry. The protein aggregation and sedimentation is especially troubling for the production of a spray dried nutritional powder, as the protein aggregation and sedimentation can clog the spray drying equipment and, at the very least, require more frequent maintenance and cleaning of the equipment, which would have the effect of increasing manufacture time and costs.

Accordingly, there exists a need to minimize or reduce the stability issues that occur during the preparation of spray dried nutritional powders containing calcium HMB.

SUMMARY

It has now also been found that the undesirable aromas or odors from nutritional powders comprising HMB can be minimized or eliminated by formulating the nutritional powders with spray dried HMB, wherein the HMB is spray dried with at least a portion of at least one of the protein, the carbohydrate, and the fat in the composition.

One embodiment of the present disclosure is directed to a nutritional powder comprising HMB and at least one of protein, carbohydrate, and fat, wherein at least a portion of the HMB is spray dried in combination with at least a portion of at least one of the protein, carbohydrate, and fat in the nutritional powder.

Another embodiment of the present disclosure is directed to a nutritional powder comprising from about 0.1% to about 8% HMB, from about 5% to about 70% protein, from about 10% to about 75% carbohydrate, and from about 20% to about 85% fat, all by weight of the nutritional powder, wherein least a portion of the HMB is spray dried with at least a portion of at least one of the protein, the carbohydrate, and the fat in the composition.

Another embodiment of the present disclosure is directed to a method of preparing a nutritional powder comprising spray dried HMB. The method comprises preparing a liquid composition comprising HMB and at least one of protein, carbohydrate, and fat, and then spray drying the liquid composition to produce a nutritional powder having improved sensory properties.

It has now also been found that issues relating to physical stability during the preparation of the spray dried nutritional powder comprising calcium HMB can be minimized or eliminated through the use of the at least one chelating agent in combination with calcium HMB as disclosed herein.

Another embodiment of the present disclosure is directed to a nutritional powder comprising soluble calcium, protein, and at least one chelating agent selected from the group consisting of a soluble citrate, a soluble phosphate, and combinations thereof. At least a portion of the soluble calcium is calcium HMB. At least a portion of the protein is soluble protein. The powder has a weight ratio of soluble calcium binding capacity to total soluble calcium from about 2.3:1 to about 12:1. The calcium HMB, the protein, and the at least one chelating agent are spray dried together in accordance with this embodiment.

Another embodiment of present disclosure is directed to a method of preparing a nutritional powder comprising spray dried calcium HMB. The method comprises preparing an aqueous slurry by admixing at least one chelating agent followed by soluble calcium to water. At least a portion of the soluble calcium is calcium HMB, and the at least one chelating agent is selected from the group consisting of a soluble citrate, a soluble phosphate, and combinations thereof. The method also includes holding the aqueous slurry under agitation for at least 10 minutes; admixing protein to the aqueous slurry, where at least a portion of the protein is soluble protein; and spray drying the aqueous slurry to produce the nutritional powder. The nutritional powder has a weight ratio of soluble calcium binding capacity to total soluble calcium from about 2.3:1 to about 12:1. In accordance with this and other embodiments, the method further comprises admixing carbohydrate to the aqueous slurry prior the addition of the protein. Additionally, in accordance with this and other embodiments, the method further comprises admixing fat into the aqueous slurry after the addition of the carbohydrate but prior to spray drying.

DETAILED DESCRIPTION

The nutritional powders comprise spray dried HMB and other nutrients. These and other exemplary features of the nutritional powders, including methods of making such powders, as well as some of the many optional variations and additions thereof, are described in detail hereafter.

The term "HMB" as used herein, unless otherwise specified, refers to beta-hydroxy-beta-methylbutyrate (also referred to as beta-hydroxyl-3-methyl butyric acid, beta-hydroxy isovaleric acid) and sources thereof. All weights, percentages, and concentrations as used herein to characterize HMB are based on the weight of HMB, except that all weights, percentages, and concentrations as used herein to characterize calcium HMB are based on the weight of calcium HMB monohydrate, unless otherwise specified.

The term "nutritional powder" as used herein, unless otherwise specified, refers to nutritional powders comprising HMB and at least one of protein, carbohydrate, and fat, which are reconstitutable with an aqueous liquid, and which are suitable for oral administration to a human.

The terms "fat" and "oil" as used herein, unless otherwise specified, are used interchangeably to refer to lipid materials derived or processed from plants or animals.

All percentages, parts and ratios as used herein, are by weight of the total composition, unless otherwise specified. All such weights as they pertain to listed ingredients are based on the active level and, therefore, do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The various embodiments of the nutritional powders of the present disclosure may also be substantially free of any optional or selected essential ingredient or feature described herein, provided that the remaining nutritional powder still contains all of the required ingredients or features as described herein. In this context, and unless otherwise specified, the term "substantially free" means that the selected nutritional powder contains less than a functional amount of the optional ingredient, typically less than about 0.5%, including less than about 0.1%, and also including zero percent, by weight of such optional or selected essential ingredient.

The nutritional powders and corresponding manufacturing methods of the present disclosure can comprise, consist of, or consist essentially of the essential elements of the disclosure as described herein, as well as any additional or optional element described herein or otherwise useful in nutritional powder formula applications.

Product Form

The nutritional powders are typically in the form of flowable or substantially flowable particulate compositions, or at least particulate compositions that can easily be scooped and measured with a spoon or similar other device, wherein the compositions can easily be reconstituted by the intended user with a suitable aqueous liquid, typically water, to form a liquid nutritional formulation for immediate oral or enteral use. In this context, "immediate" use generally means within about 48 hours, most typically within about 24 hours, preferably right after reconstitution. In accordance with exemplary embodiments disclosed herein, the nutritional powders are produced by spray drying.

The nutritional powders may be formulated with sufficient kinds and amounts of nutrients so as to provide a sole, primary, or supplemental source of nutrition, or to provide a specialized nutritional powder for use in individuals afflicted with specific diseases or conditions. In one specific embodiment, the nutritional powder may be formulated for use with individuals for maintaining or building muscle mass.

The nutritional powders may be reconstituted with water prior to use to a caloric density tailored to the nutritional needs of the ultimate user, although in most instances the powders are reconstituted with water to form compositions comprising from about 100 kcal to about 500 kcal per 240 ml, including from about 150 to about 350 kcal per 240 ml, and also including from about 200 kcal to about 320 kcal per 240 ml. The amount of calcium HMB in the reconstituted liquids most typically ranges from about 0.4 g per 240 ml to about 3 g per 240 ml, including from about 0.75 g per 240 ml to about 2 g per 240 ml, and including about 1.5 g per 240 ml.

Although the serving size for the reconstituted nutritional liquid can vary depending upon a number of variables, a typical serving size ranges from about 100 ml to about 300 ml, including from about 150 ml to about 250 ml, and including from about 190 ml to about 240 ml.

Macronutrients

The nutritional powders comprise at least one of protein, carbohydrate, and fat. In accordance with certain embodiments, the nutritional powders comprise protein. In accordance with the preceding and other embodiments, at least a portion of the protein is soluble protein. In addition, in accordance with certain embodiments, the nutritional powders disclosed herein include protein and at least one of carbohydrate and fat. Generally, any source of protein, carbohydrate, and fat that is known or otherwise suitable for use in nutritional products may be suitable for use herein, provided that such macronutrients are also compatible with the essential elements and other desired properties of the nutritional powders as defined herein.

Although total concentrations or amounts of the protein, carbohydrate, and fat may vary depending upon the nutritional needs of the intended user, such concentrations or amounts most typically fall within one of the following embodied ranges, inclusive of any other essential protein, carbohydrate, and fat ingredients as described herein.

Protein concentrations may range from 0 to about 90%, including from about 5% to about 75%, including from about 8% to about 50%, and also including from about 12% to about 30%, by weight of the nutritional powder.

Carbohydrate concentrations may range from 0 to about 99%, including from about 20% to about 90%, including from about 30% to about 80%, and also including from about 40% to about 70%, by weight of the nutritional powder.

Fat concentrations in the nutritional powders may range from 0 to about 99%, including from about 5% to about 75%, including from about 10% to about 35%, and also including from about 15% to about 20%, by weight of the nutritional powder.

The range or level of protein, carbohydrate, and fat in the nutritional powders may also be characterized in addition to or in the alternative as a percentage of total calories in the nutritional powder as set forth in the following table.

| Nutrient | Embodiment A (% of Total Calories) | Embodiment B (% of Total Calories) | Embodiment C (% of Total Calories) |
|---|---|---|---|
| Protein | 1-98 | 5-70 | 15-35 |
| Carbohydrate | 1-98 | 10-75 | 30-50 |
| Fat | 1-98 | 20-85 | 35-55 |

Non-limiting examples of suitable protein or sources thereof for use in the nutritional powders include hydrolyzed, partially hydrolyzed or non-hydrolyzed proteins or protein sources, which may be derived from any known or otherwise suitable source such as milk (e.g., casein, whey), animal (e.g., meat, fish), cereal (e.g., rice, corn), vegetable (e.g., soy, potato, pea) or combinations thereof. Non-limiting examples of such proteins include whey protein concentrates, whey protein isolates, whey protein hydrolysates, acid caseins, sodium caseinates, calcium caseinates, potassium caseinates, casein hydrolysates, milk protein concentrates, milk protein isolates, milk protein hydrolysates, nonfat dry milk, whole cow's milk, partially or completely defatted milk, condensed skim milk, soy protein concentrates, soy protein isolates, soy protein hydrolysates, pea protein concentrates, pea protein isolates, pea protein hydrolysates, collagen proteins, potato proteins, collagen proteins, and combinations thereof.

Non-limiting examples of suitable carbohydrates or sources thereof for use in the nutritional powders include maltodextrin, hydrolyzed or modified starch or cornstarch, glucose polymers, corn syrup, corn syrup solids, rice-derived carbohydrates, sucrose, glucose, fructose, lactose, high fructose corn syrup, honey, sugar alcohols (e.g., maltitol, erythritol, sorbitol), and combinations thereof.

Non-limiting examples of suitable fats or sources thereof for use in the nutritional powders include coconut oil, fractionated coconut oil, soy oil, corn oil, olive oil, safflower oil, high oleic safflower oil, MCT oil (medium chain triglycerides), sunflower oil, high oleic sunflower oil, palm and palm kernel oils, palm olein, canola oil, marine oils, cottonseed oils, and combinations thereof.

Soluble Protein

In accordance with certain embodiments disclosed herein, at least a portion of the protein used to formulate the nutritional powders is soluble protein. The term "soluble protein" as used herein, unless otherwise specified, refers to those proteins having a solubility of at least about 90% as measured in accordance with a Protein Solubility Measurement Test that includes the following steps: (1) suspend the protein at 2.00% (w/w) in water; (2) stir vigorously for one hour at 20° C. to form a suspension; (3) remove an aliquot of the suspension, and determine protein concentration as total protein; (4) centrifuge the suspension at 31,000 rpm and at 20° C. for one hour; (5) determine the protein concentration in the supernatant (the soluble protein); and (6) express the soluble protein as a percentage of the total protein.

The soluble protein may represent from about 50% to 100%, including from 55% to 100%, including from about 60% to about 100%, including from about 40% to about 85%, including from about 60% to about 80%, and also including from about 65% to about 75%, by weight of the total protein in the nutritional powder. The concentration of soluble protein may range from at least about 0.5%, including from about 0.5% to about 26%, including about 1% to about 26%, and also including from about 2% to about 15%, also including from about 3% to about 10%, and also including from about 4% to about 8%, by weight of the nutritional powder.

The amount of soluble protein included in the nutritional powder may also be characterized as a weight ratio of soluble protein to calcium HMB, where the nutritional powder includes a weight ratio of soluble protein to calcium HMB of at least about 3, including from about 3 to about 12, including from about 4 to about 12, also including from about 6.1 to about 12, also including from about 7 to about 11, and also including from about 8 to about 10.

Any soluble protein source is suitable for use herein provided that it meets the solubility requirement as defined herein. Non-limiting examples of suitable soluble protein includes sodium caseinate (>95% solubility as determined by the Protein Solubility Measurement Test), whey protein concentrate (>90% solubility as determined by the Protein Solubility Measurement Test), calcium caseinate (>95% solubility as determined by the Protein Solubility Measurement Test), milk protein isolate (>95% solubility as determined by the Protein Solubility Measurement Test), and combinations thereof. In certain embodiments, non-soluble proteins may also be included in the nutritional powders provided that the soluble protein component is represented in accordance with the requirements as set forth herein.

Soluble protein suitable for use herein may also be characterized by the content of phosphoserine in the protein, wherein the soluble proteins in this context are defined as those proteins having at least about 100 mmoles, including from about 150 to about 400 mmoles, including from about 200 to about 350 mmoles, and also including from about 250 to about 350 mmoles, of phosphoserine per kilogram of protein.

When the soluble protein is defined in terms of phosphoserine content, it has been found that the weight ratio of the soluble protein (with the defined phosphoserine content) to the calcium HMB may be at least about 3:1, including at least about 5:1, and also including at least about 7:1, and also including from about 9:1 to about 30:1. In this context, the proteins having the requisite content of phosphoserine are most typically in the form of monovalent caseinate salts such as sodium caseinate, calcium caseinate, potassium caseinate, and combinations thereof.

In one embodiment, the soluble protein may also be characterized by a mole ratio of monovalent caseinate phosphoserine to calcium HMB monohydrate of least about 0.2, including from about 0.2 to about 2, and also including from about 0.25 to about 1.7.

It should be understood, however, that any phosphoserine-containing protein may be suitable for use herein provided that it has the requisite phosphoserine content and that the phosphoserine used in calculating the ratios are not bound, complexed, or otherwise attached to a polyvalent cation such as calcium or magnesium.

It should also be noted that alternative definitions as described herein for soluble proteins may include proteins that have little or no phosphoserine content, so that the soluble protein fraction of the compositions may include soluble protein with or without phosphoserine. The soluble protein for use herein may therefore be defined by any one or more of the soluble protein characterizations, separately or in combination.

The phosphoserine moieties within the protein may therefore be available for binding with the calcium released from the calcium HMB so that the above ratios of soluble protein to calcium HMB are the ratio of protein with phosphoserine moities that are unbound, unattached, or otherwise available to bind soluble calcium from the calcium HMB during formulation. It could be, for example, that a mixture of calcium caseinate and sodium caseinate are used in the composition, but the ratio of proteins defined by a phosphoserine content to calcium HMB is calculated based on the protein fraction from the sodium caseinate and additionally any protein from the calcium caseinate fraction that is not bound to calcium.

HMB

The HMB component of the nutritional powders may be obtained from any HMB source suitable for use in a nutritional product. Such sources include HMB as a free acid, a salt, an anhydrous or hydrated salt, an ester, a lactone, or other forms that otherwise provide a bioavailable form of HMB for the nutritional powder.

Non-limiting examples of suitable HMB sources include HMB salts, hydrated or anhydrous, of sodium, potassium, magnesium, chromium, calcium, or other non-toxic salt forms. Calcium HMB is used in accordance with certain embodiments disclosed herein, and is most typically formulated or otherwise obtained as calcium HMB monohydrate, a commercially available source of which is available from Technical Sourcing International (TSI) of Salt Lake City, Utah USA.

The total concentration of HMB in the nutritional powders may range up to about 10%, including from about 0.1% to about 10%, including from about 0.1% to about 8%, and also including from about 0.2% to about 5.0%, and also including from about 0.3% to about 3%, and also including from about 0.4% to about 1.5%, by weight of the nutritional powder. Such concentrations may represent the concentration of HMB or the HMB source for use in the composition. In accordance with certain embodiments, when the HMB source is calcium HMB, the total concentration of calcium HMB (e.g., calcium HMB monohydrate) in the nutritional powders may range up to about 10%, including from about 0.1% to about 10%, including from about 0.1% to about 8%, and also including from about 0.2% to about 5.0%, and also including from about 0.3% to about 3%, and also including from about 0.4% to about 1.5%, by weight of the nutritional powder.

All or a portion of the HMB, including but not limited to calcium HMB, used in the preparation of the final nutritional powder is in the form of spray dried calcium HMB, as described herein.

Chelating Agents

In accordance with certain embodiments, the nutritional powders disclosed herein include at least one chelating agent. As discussed above, the presence of calcium HMB in the formulation used to produce the nutritional powder can adversely affect the manufacture and production of spray dried powders. In particular, the presence of the calcium HMB in the formulation will tend to cause protein present in the formulation to aggregate or form sediment, as a result of disassociated calcium from the calcium HMB interacting with the protein. The aggregation and sedimentation of the protein prompts the need for more frequent cleaning and maintenance of the spray drying equipment, as the aggregation and sedimentation may cause the equipment to operate less efficiently, and in some instances clog. The presence of the chelating agent in the formulations of the nutritional powders disclosed herein can reduce or minimize the aforementioned physical stability issues caused by the presence of the calcium HMB in the nutritional powders containing protein. The chelating agents are effective to minimize or reduce the aggregation and sedimentation during the production of the spray dried nutritional powder when the chelating agent and the calcium HMB are given time to chelate prior to the introduction of protein to the formulation. Accordingly, as discussed in greater detail below, the chelating agent and the calcium HMB are introduced into the slurry used to prepare the spray dried nutritional powder and held for at least 10 minutes prior to introduction of the protein into such slurry.

Nonlimiting examples of suitable chelating agents for use in the nutritional powders disclosed herein include citrates and phosphates. Examples of soluble citrates include, but are not limited to, alkali metal salts of citrates, such as potassium citrate, and sodium citrate. Examples of soluble phosphates include, but are not limited to, alkali metal salts of phosphates, such as dipotassium phosphate, disodium phosphate (commonly available in anhydrous form), and the like, and alkali earth metal salts of phosphates, such as tricalcium phosphate.

Soluble Calcium Binding Capacity

The amount of chelating agents used to reduce or minimize the production issues associated with the calcium HMB, may be characterized in terms of the weight ratio of soluble calcium binding capacity (SCBC) to total soluble calcium in the nutritional powder. This ratio is determined according to the following formulas I and II:

$$\text{Ratio} = \text{SCBC}/[\text{soluble calcium}] \quad (I),$$

and $$\text{SCBC} = (0.32 \times [\text{soluble citrate}] + 0.63 \times [\text{soluble phosphate}] + 0.013 \times [\text{soluble protein}]) \quad (II),$$

where [soluble calcium], [soluble citrate], [soluble phosphate], and [soluble protein] represent the concentration (w/w) of each respective component in the nutritional powder.

The weight ratio of SCBC to the concentration of total soluble calcium can be adjusted to minimize the concentration of unbound (disassociated) calcium that is present in the slurry that is used during the spray drying of the powder, or to minimize the weight ratio of such unbound (disassociated) calcium to HMB in the slurry. This adjustment improves the slurry's physical stability, and consequently minimizes or reduces the production issues associated with spray drying nutritional product comprising calcium HMB.

The ratio of the soluble calcium binding capacity, as defined above, to total soluble calcium of the nutritional emulsions is a weight ratio of at least about 2.3, including from about 2.3 to about 12.0, also including from about 3.0 to about 8.0, and also including from about 4.0 to about 6.5.

The nutritional powders of the present disclosure comprise soluble calcium as a desirable ingredient to facilitate developing or maintaining of healthy muscle in targeted individuals. In this context, the term "soluble calcium" refers to the equivalents of ionized or supernatant calcium in the slurry used to prepare the spray dried powder as measured at 20° C. At least a portion of the soluble calcium is provided by calcium HMB as described herein. Any other calcium source, however, may be used provided that such other source is compatible with the essential other ingredients of the nutritional powders disclosed herein as well as compatible with the requirements set forth by the ratio of SCBC to total calcium as described above.

The calcium in the nutritional powders may also be characterized by a ratio (on an equivalents basis) of soluble citrate to soluble calcium of not more than 5, including not more than 4, also including not more than 3, and also including from about 0.8 to about 3. In this context, the terms "soluble citrate" refers to the equivalents of citrate cations, respectively, present in supernatants of the nutritional slurry as measured at 20° C.

In accordance with certain embodiments, the weight ratio of calcium HMB to the soluble calcium ranges from about 6:1 to about 15:1, including from about 6:1 to about 12:1, also including from about 6:1 to about 10:1, and also including from about 6:1 to about 8:1.

Vitamin D

The nutritional powders may further comprise vitamin D to help maintain healthy muscle in the targeted user. Vitamin D forms include Vitamin D2 (ergocalciferol) and Vitamin D3 (cholecalciferol) or other forms suitable for use in a nutritional product.

The amount of Vitamin D in the nutritional powder typically ranges up to about 1000 IU, including from about 10 IU to about 600 IU, and also including from about 50 IU to about 400 IU per serving size as described herein.

Optional Ingredients

The nutritional powders may further comprise other optional ingredients that may modify the physical, chemical, hedonic or processing characteristics of the products or serve as pharmaceutical or additional nutritional components when used in the targeted population. Many such optional ingredients are known or otherwise suitable for use in other nutritional products and may also be used in the nutritional powders described herein, provided that such optional ingredients are suitable for oral administration and are compatible with the essential ingredients in the nutritional powders.

Non-limiting examples of such optional ingredients include preservatives, antioxidants, emulsifying agents, buffers, pharmaceutical actives, additional nutrients as described herein, colorants, flavors, thickening agents, stabilizers, and masking agents, and combinations thereof.

The nutritional powders may further comprise vitamins or related nutrients, non-limiting examples of which include vitamin A, vitamin E, vitamin K, thiamine, riboflavin, pyridoxine, vitamin B12, carotenoids, niacin, folic acid, pantothenic acid, biotin, vitamin C, choline, inositol, salts, and derivatives thereof, and combinations thereof.

The nutritional powders may further comprise minerals, non-limiting examples of which include phosphorus, magnesium, iron, zinc, manganese, copper, sodium, potassium, molybdenum, chromium, selenium, chloride, and combinations thereof.

Method of Use

The nutritional powders are reconstituted with water or other suitable liquid to provide a nutritional liquid. Such liquids from the powders described herein are useful in methods of providing supplemental, primary, or sole sources of nutrition, or in methods of providing individuals one or more benefits as described herein. In certain embodiments, the liquids may be administered orally as needed to provide the desired level of nutrition, most typically in the form of one to two servings daily, in one or more divided doses daily. For example, serving sizes typically ranging from about 100 ml to about 300 ml, including from about 150 ml to about 250 ml, and including from about 190 ml to about 240 ml, wherein each serving contains from about 0.4 g to about 3.0 g, including from about 0.75 g to about 2.0 g, and including about 1.5 g, of calcium HMB per serving.

Such methods are further directed to providing individuals upon administration of such products, most typically after daily use over an extended period of time of from about 1 month to about 6 months, including from about 1 month to about 3 months, one or more of 1) supporting maintenance of lean body mass, 2) supporting of strength, muscle strength or both, 3) decreasing protein breakdown and damage of muscle cells, and 4) helping with muscle recovery following exercise or other trauma, and 5) reducing muscle protein breakdown following exercise.

Such methods are also helpful to achieve one or more of 1) maintaining and supporting lean body mass in elderly with sarcopenia, 2) providing nutrition to support an active and independent lifestyle in individuals, especially in the elderly, 3) supporting recovery of muscle strength, 4) helping rebuild muscle and regain strength, and 5) improving strength, including muscle strength, and mobility.

Methods of Manufacture

The nutritional powders may be prepared by any collection of known or otherwise effective techniques, suitable for making and formulating a nutritional powder provided that the techniques include or are modified to include a spray drying step to provide the powder with the requisite spray dried HMB ingredient.

The spray drying step may likewise include any spray drying technique that is known for or otherwise suitable for use in the production of nutritional powders. Many different spray drying methods and techniques are known for use in the nutrition field, all of which may be suitable for use in the manufacture of the nutritional powders herein.

One method of preparing the nutritional powder comprises forming an aqueous slurry or liquid comprising HMB and at least one of protein, carbohydrate, and fat, and then spray drying the slurry or liquid to produce a spray dried nutritional powder comprising spray dried HMB and having improved sensory properties. The method may further comprise the step of spray drying, dry mixing (also known as dry blending), or otherwise adding additional nutritional ingredients, including any one or more of the ingredients described herein, to the spray dried nutritional powder.

In some embodiments, the methods of manufacture are formulated with calcium HMB, which is most typically formulated as calcium HMB monohydrate, as the HMB source for use in the methods.

In accordance with certain embodiments, when the nutritional powders for spray drying are formulated with calcium HMB, the nutritional powders are formulated with at least one chelating agent in the following manner so as to minimize or avoid the aggregation and sedimentation issues associated with the use of calcium HMB. Firstly, the chelating agents are admixed into an aqueous slurry or liquid. The calcium HMB is then admixed to the aqueous slurry or liquid containing the chelating agents. The aqueous slurry or liquid containing the chelating agents and the calcium HMB are then held for at least 10 minutes under agitation, so to allow the disassociated or unbound calcium from the calcium HMB to chelate with the chelating agents in the slurry or liquid. Following the hold time, the protein, of which at least a portion is soluble protein as discussed herein, is admixed into the aqueous slurry or liquid. In accordance with certain of the preceding embodiments, when the nutritional powder formulation contains carbohydrates, the at least a portion of the carbohydrates is added before the protein is added to the slurry. Any other portion of carbohydrates may be dry mixed into the nutritional powder following spray drying. In accordance with certain of the preceding embodiments, when fat is present in the formulation of the nutritional powder, the fat is added after the protein and any carbohydrate are added, but before spray drying. The following paragraphs outline an exemplary, more detailed description of the formulation of slurries which may be used in the preparation of the exemplary spray dried nutritional powders disclosed herein.

In one suitable method of manufacturing the nutritional powder, at least three separate slurries are prepared, including a protein-in-fat (PIF) slurry, a carbohydrate-mineral (CHO-MN) slurry, and a protein-in-water (PIW) slurry. The PIF slurry is formed by heating and mixing the selected oils (e.g., canola oil, corn oil) to a specified temperature and then adding an emulsifier (e.g., lecithin), fat soluble vitamins, and a portion of the total protein (e.g., milk protein concentrate) with continued heat and agitation. The CHO-MN slurry is formed by adding with heated agitation to water: minerals (e.g., potassium citrate, dipotassium phosphate, sodium citrate), trace and ultra trace minerals (TM/UTM premix), thickening or suspending agents (e.g., gellan, carrageenan), and calcium HMB and any additional other HMB source. The heated agitation occurs at a specified temperature range. The resulting CHO-MIN slurry is held for 10 minutes with continued heat and agitation before adding any additional minerals (e.g., potassium chloride, magnesium carbonate, potassium iodide) and any carbohydrates (e.g., frucotooligosaccharide, sucrose, corn syrup). The third, PIW slurry is then formed by mixing with heat, at a specified temperature range, and agitation the remaining protein (e.g., sodium caseinate, soy protein concentrate) into water.

The resultant slurries are then blended together with heated agitation, at a specified temperature range, and the pH adjusted to the desired range, typically from 6.6-7.0, after which the composition is subjected to high-temperature short-time (HTST) processing during which the composition is heat treated as is known in the art, emulsified and homogenized. Water soluble vitamins and ascorbic acid are added, the pH is again adjusted to the desired range if necessary, flavors are added, and water is added to achieve the desired total solid level. The resultant slurry is then subjected to spray drying to form the nutritional powder.

In accordance with one or more of the methods of manufacture disclosed herein, a method is directed to the preparation of a nutritional powder comprising spray dried HMB. The method includes preparing an aqueous slurry by admixing at least one chelating agent followed by soluble calcium to water. At least a portion of the soluble calcium is calcium HMB, and the at least one chelating agent is selected from the group consisting of a soluble citrate, a soluble phosphate, and combinations thereof. The method also includes holding the aqueous slurry under agitation for at least 10 minutes; admixing protein to the aqueous slurry, where at least a portion of the protein is soluble protein; and spray drying the aqueous slurry to produce the nutritional powder. The nutritional powder has a weight ratio of soluble calcium binding capacity to total soluble calcium from about 2.3:1 to about 12:1. In accordance with the preceding and other exemplary embodiments, the method further comprises admixing carbohydrate to the aqueous slurry prior the addition of the protein. Additionally, in accordance with the preceding and other embodiments, the method further comprises admixing fat into the aqueous slurry after the addition of the protein and any carbohydrate but prior to spray drying.

In accordance with some of the exemplary methods of manufacture disclosed herein, all of the HMB in the nutritional powder is spray dried as described herein, including from about 50% to about 100%, by weight of the nutritional powder is spray dried as well. In certain embodiments therefore, most or all of the ingredients in the nutritional powder, including all of the HMB in the powder, are spray dried together to form a spray dried nutritional powder wherein 100% of the HMB is therefore spray dried HMB.

Also in accordance with some of the exemplary methods of manufacture disclosed herein, a portion of the HMB in the nutritional powder may be spray dried with some or all of at least one of the protein, carbohydrate, and/or the fat in the nutritional powder, including from about 20% to about 90%, also including from about 40% to about 90%, and also including from about 50% to about 80%, by weight of the total HMB as spray dried HMB. In such nutritional powders, a portion of the HMB may be non-spray dried and thus represent from about 10% to about 80%, including from about 10% to about 60%, and also including from about 20% to about 50%, by weight of the total HMB in the nutritional powder.

The nutritional powders are preferably spray dried to a moisture content of less than about 3.0%, most typically from about 1.0% to about 2.8%, by weight of the finished powder.

EXAMPLES

The following examples illustrate specific embodiments and/or features of the nutritional powders comprising spray dried HMB. The examples are given solely for the purpose of illustration and are not to be construed as limitations of the present disclosure, as many variations thereof are possible without departing from the spirit and scope of the general inventive concepts. All exemplified amounts are weight percentages based upon the total weight of the composition, unless otherwise specified.

The exemplified compositions are nutritional powders prepared in accordance with the manufacturing methods described herein, such that each exemplified nutritional powder comprising spray dried HMB has minimal or no protein aggregation or sedimentation issues associated with the calcium HMB, along with minimal or no off odors when packaged in sealed containers, and then a portion of which is later removed and reconstituted with water to the desired caloric density to form a nutritional liquid containing 1.5 g of calcium HMB monohydrate per 240 ml of reconstituted liquid. The 240 ml liquid represents a single serving suitable for oral administration within 48 hours following such constitution.

In general, each of the exemplified compositions can be manufactured by 1) preparing a first liquid slurry (CHO/MIN) comprising adding chelating agents, followed by calcium HMB monohydrate and any minerals to water, then after a 10 minute hold time, adding the carbohydrates, and, 2) preparing a second liquid slurry comprising oils, stabilizers, oil soluble vitamins, and protein (PIF), 3) preparing a third liquid slurry comprising protein an water (PIW), 4) blending the first and second slurries together, and then blending the resulting slurry with the third slurry, 5) subjecting the resulting blend to homogenization and heat treatment, 6) standardizing the resulting homogenized blend with vitamins, flavors, trace and ultra trace minerals, and other heat sensitive ingredients, and then 7) spray drying the standardized blend to form a spray dried nutritional powder. The spray dried powder is then package and hermetically sealed in appropriate containers suitable for long term storage prior to use, during which the product may be opened and product reconstituted to form a nutritional liquid and administered in accordance with the methods described herein.

Examples 1-4

Examples 1-4 illustrate nutritional powders of the present disclosure, the ingredients of which are listed in the table below. All ingredient amounts are listed as kilogram per 1000 kilogram batch of product, unless otherwise specified.

| Ingredient | Example 1 | Example 2 | Example 3 | Example 4 |
|---|---|---|---|---|
| Whey Protein Concentrate | 282.051 | 293.892 | 289.892 | 284.892 |
| Calcium Caseinate | 192.308 | 192.308 | 192.308 | 192.308 |
| Maltodextrin | 165.416 | 165.416 | 165.416 | 165.416 |
| Milk Protein Isolate | 138.782 | 138.782 | 138.782 | 138.782 |
| Cocoa | 76.932 | 76.932 | 76.932 | 76.932 |
| Sunflower Oil Creamer | 21.474 | 21.474 | 21.474 | 21.474 |
| Oil Preblend | 19.231 | 19.231 | 19.231 | 19.231 |
| Chocolate Cream | 15.256 | 15.256 | 15.256 | 15.256 |
| Calcium HMB Monohydrate | 13.157 | 1.316 | 5.316 | 10.316 |
| Oat Fiber | 10.897 | 10.897 | 10.897 | 10.897 |
| Tricalcium Phosphate | 8.526 | 8.526 | 8.526 | 8.526 |
| Vitamin Mineral Preblend | 8.462 | 8.462 | 8.462 | 8.462 |
| Dipotassium Phosphate | 8.333 | 8.333 | 8.333 | 8.333 |
| Rich Dark Chocolate | 7.051 | 7.051 | 7.051 | 7.051 |
| Carrageenan | 6.474 | 6.474 | 6.474 | 6.474 |
| Potassium Chloride | 5.128 | 5.128 | 5.128 | 5.128 |
| Salt | 3.205 | 3.205 | 3.205 | 3.205 |
| Xanthan Gum | 3.205 | 3.205 | 3.205 | 3.205 |
| Choline Bitartrate 41% Choline | 2.782 | 2.782 | 2.782 | 2.782 |
| Acesulfame K | 2.718 | 2.718 | 2.718 | 2.718 |
| Vanilla | 1.923 | 1.923 | 1.923 | 1.923 |
| Disodium Phosphate Anhydrous | 1.667 | 1.667 | 1.667 | 1.667 |
| Whey Protein Isolate | 1.282 | 1.282 | 1.282 | 1.282 |
| Beta Carotene 1% | 1.128 | 1.128 | 1.128 | 1.128 |
| Sucralose | 692.3 g | 692.3 | 692.3 | 692.3 |
| Potassium Citrate 38% K | 641.0 g | 641.0 | 641.0 | 641.0 |
| Alpha ketoglutaric Acid | 321.0 g | 321.0 | 321.0 | 321.0 |
| Egg Albumin Powder | 321.0 g | 321.0 | 321.0 | 321.0 |
| L-Glutamine | 321.0 g | 321.0 | 321.0 | 321.0 |
| Taurine | 321.0 g | 321.0 | 321.0 | 321.0 |

Examples 5-8

Examples 5-8 illustrate nutritional powders of the present disclosure, the ingredients of which are listed in the table below. All ingredient amounts are listed as kg per 1000 kg batch of product, unless otherwise specified.

| Ingredient | Example 5 | Example 6 | Example 7 | Example 8 |
|---|---|---|---|---|
| Whey Protein Concentrate | 280.051 | 272.051 | 262.051 | 232.051 |
| Calcium Caseinate | 192.308 | 192.308 | 192.308 | 192.308 |
| Maltodextrin | 165.416 | 165.416 | 165.416 | 165.416 |
| Milk Protein Isolate | 138.782 | 138.782 | 138.782 | 138.782 |
| Cocoa | 76.932 | 76.932 | 76.932 | 76.932 |
| Sunflower Oil Creamer | 21.474 | 21.474 | 21.474 | 21.474 |
| Oil Preblend | 19.231 | 19.231 | 19.231 | 19.231 |
| Chocolate Cream | 15.256 | 15.256 | 15.256 | 15.256 |
| Calcium HMB Monohydrate | 15.157 | 25.157 | 35.157 | 50.157 |
| Oat Fiber | 10.897 | 10.897 | 10.897 | 10.897 |
| Tricalcium Phosphate | 8.526 | 8.526 | 8.526 | 8.526 |
| Vitamin Mineral Preblend | 8.462 | 8.462 | 8.462 | 8.462 |
| Dipotassium Phosphate | 8.333 | 7.051 | 7.051 | 7.051 |
| Rich Dark Chocolate | 7.051 | 7.051 | 7.051 | 7.051 |
| Carrageenan | 6.474 | 6.474 | 6.474 | 6.474 |
| Potassium Chloride | 5.128 | 5.128 | 5.128 | 5.128 |
| Salt | 3.205 | 3.205 | 3.205 | 3.205 |
| Xanthan Gum | 3.205 | 3.205 | 3.205 | 3.205 |
| Choline Bitartrate 41% Choline | 2.782 | 2.782 | 2.782 | 2.782 |
| Acesulfame K | 2.718 | 2.718 | 2.718 | 2.718 |
| Vanilla | 1.923 | 1.923 | 1.923 | 1.923 |
| Disodium Phosphate Anhydrous | 1.667 | 1.667 | 1.667 | 1.667 |
| Whey Protein Isolate | 1.282 | 1.282 | 1.282 | 1.282 |
| Beta Carotene 1% | 1.128 | 1.128 | 1.128 | 1.128 |
| Sucralose | 692.3 g | 692.3 g | 692.3 g | 692.3 g |
| Potassium Citrate 38% K | 641.0 g | 641.0 g | 641.0 g | 641.0 g |
| Alpha ketoglutaric Acid | 321.0 g | 321.0 g | 321.0 g | 321.0 g |
| Egg Albumin Powder | 321.0 g | 321.0 g | 321.0 g | 321.0 g |
| L-Glutamine | 321.0 g | 321.0 g | 321.0 g | 321.0 g |
| Taurine | 321.0 g | 321.0 g | 321.0 g | 321.0 g |

Examples 9-12

Examples 9-12 illustrate nutritional powders of the present disclosure, the ingredients of which are listed in the table below. All ingredient amounts are listed as kg per 1000 kg batch of product, unless otherwise specified.

| Ingredient | Example 9 | Example 10 | Example 11 | Example 12 |
|---|---|---|---|---|
| Whey Protein Concentrate | 235.051 | 230.051 | 225.051 | 216.051 |
| Calcium Caseinate | 192.308 | 192.308 | 192.308 | 192.308 |
| Maltodextrin | 165.416 | 165.416 | 165.416 | 165.416 |
| Milk Protein Isolate | 138.782 | 138.782 | 138.782 | 138.782 |
| Dutch Cocoa | 76.932 | 76.932 | 76.932 | 76.932 |
| Sunflower Oil Creamer | 21.474 | 21.474 | 21.474 | 21.474 |
| Oil Preblend | 19.231 | 19.231 | 19.231 | 19.231 |
| Chocolate Cream | 15.256 | 15.256 | 15.256 | 15.256 |
| Calcium HMB Monohydrate | 60.157 | 65.157 | 70.157 | 79.157 |
| Oat Fiber | 10.897 | 10.897 | 10.897 | 10.897 |
| Tricalcium Phosphate | 8.526 | 8.526 | 8.526 | 8.526 |
| Vitamin Mineral Preblend | 8.462 | 8.462 | 8.462 | 8.462 |
| Dipotassium Phosphate | 8.333 | 8.333 | 8.333 | 8.333 |
| Rich Dark Chocolate | 7.051 | 7.051 | 7.051 | 7.051 |
| Carrageenan | 6.474 | 6.474 | 6.474 | 6.474 |
| Potassium Chloride | 5.128 | 5.128 | 5.128 | 5.128 |
| Salt | 3.205 | 3.205 | 3.205 | 3.205 |
| Xanthan Gum | 3.205 | 3.205 | 3.205 | 3.205 |
| Choline Bitartrate 41% Choline | 2.782 | 2.782 | 2.782 | 2.782 |
| Acesulfame K | 2.718 | 2.718 | 2.718 | 2.718 |
| Vanilla | 1.923 | 1.923 | 1.923 | 1.923 |
| Disodium Phosphate Anhydrous | 1.667 | 1.667 | 1.667 | 1.667 |
| Whey Protein Isolate | 1.282 | 1.282 | 1.282 | 1.282 |
| Beta Carotene 1% | 1.128 | 1.128 | 1.128 | 1.128 |

-continued

| Ingredient | Example 9 | Example 10 | Example 11 | Example 12 |
|---|---|---|---|---|
| Sucralose | 692.3 g | 692.3 g | 692.3 g | 692.3 g |
| Potassium Citrate 38% K | 641.0 g | 641.0 g | 641.0 g | 641.0 g |
| Alpha ketoglutaric Acid | 321.0 g | 321.0 g | 321.0 g | 321.0 g |
| Egg Albumin Powder | 321.0 g | 321.0 g | 321.0 g | 321.0 g |
| L-Glutamine | 321.0 g | 321.0 g | 321.0 g | 321.0 g |
| Taurine | 321.0 g | 321.0 g | 321.0 g | 321.0 g |

What is claimed is:

1. A method of preparing a nutritional powder comprising spray dried calcium beta-hydroxy-beta-methylbutyrate (HVIB), the method comprising:
   preparing an aqueous slurry by admixing at least one chelating agent followed by soluble calcium to water, wherein at least a portion of the soluble calcium is calcium HMB and wherein the at least one chelating agent is selected from the group consisting of a soluble citrate, a soluble phosphate, and combinations thereof;
   holding the aqueous slurry under agitation for at least 10 minutes;
   admixing protein to the aqueous slurry containing the chelating agent and the soluble calcium, wherein at least a portion of the protein is soluble protein; and
   spray drying the aqueous slurry to produce the nutritional powder,
   wherein the powder has a weight ratio of soluble calcium binding capacity to total soluble calcium from about 2.3:1 to about 12:1.

2. The method of claim 1, further comprising:
   admixing carbohydrate to the aqueous slurry prior the addition of the protein.

3. The method of claim 2, further comprising:
   admixing fat into the aqueous slurry after the addition of the carbohydrate but prior to spray drying.

4. The method of claim 2, further comprising dryblending additional carbohydrate into the nutritional powder following the spray drying.

5. The method of claim 1, wherein the powder comprises from about 0.1% to about 8% by weight of calcium HMB.

6. The method of claim 5, wherein the powder comprises from about 12% to about 30% protein, from about 30% to about 80% carbohydrate, and from about 10% to about 35% fat, all by weight of the nutritional powder.

7. The method of claim 1, wherein the at least one chelating agent is selected from the group consisting of tricalcium phosphate, dipotassium phosphate, disodium phosphate, and potassium citrate.

* * * * *

UNITED STATES PATENT AND TRADEMARK OFFICE
CERTIFICATE OF CORRECTION

PATENT NO. : 9,693,577 B2  
APPLICATION NO. : 14/043470  
DATED : July 4, 2017  
INVENTOR(S) : Charles Helmke et al.

Page 1 of 1

It is certified that error appears in the above-identified patent and that said Letters Patent is hereby corrected as shown below:

In the Claims

Claim 1, Column 15, Line 15, change "(HIVIB)" to --(HMB)--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*